United States Patent
Ogata et al.

(10) Patent No.: US 12,530,971 B2
(45) Date of Patent: Jan. 20, 2026

(54) DRIVING ASSISTANCE DEVICE

(71) Applicant: HITACHI ASTEMO, LTD., Ibaraki (JP)

(72) Inventors: Takehito Ogata, Tokyo (JP); Hideyuki Kume, Tokyo (JP); Morihiko Sakano, Tokyo (JP); Yuichi Komoriya, Hitachinaka (JP); Hidehiro Toyoda, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 174 days.

(21) Appl. No.: 18/286,652

(22) PCT Filed: Feb. 1, 2022

(86) PCT No.: PCT/JP2022/003850
§ 371 (c)(1),
(2) Date: Oct. 12, 2023

(87) PCT Pub. No.: WO2022/219884
PCT Pub. Date: Oct. 20, 2022

(65) Prior Publication Data
US 2024/0221506 A1    Jul. 4, 2024

(30) Foreign Application Priority Data
Apr. 15, 2021 (JP) ................. 2021-068939

(51) Int. Cl.
*G08G 1/16*      (2006.01)
*B60W 10/20*   (2006.01)
(Continued)

(52) U.S. Cl.
CPC ............ *G08G 1/166* (2013.01); *B60W 10/20* (2013.01); *B60W 30/09* (2013.01); *G06V 20/56* (2022.01);
(Continued)

(58) Field of Classification Search
CPC .......... B60W 10/20; B60W 2050/143; B60W 2520/10; B60W 2555/60; B60W 2720/10;
(Continued)

(56) References Cited

U.S. PATENT DOCUMENTS 9,786,178 B1 * 10/2017 Bai .................... B60K 35/29
10,730,513 B2 * 8/2020 Nagata .................. B60W 50/14
(Continued)

FOREIGN PATENT DOCUMENTS

JP    2007-047914 A    2/2007
JP    2014-206906 A    10/2014
(Continued)

OTHER PUBLICATIONS

International Search Report of PCT/JP2022/003850 dated Mar. 15, 2022.
(Continued)

*Primary Examiner* — Babar Sarwar
(74) *Attorney, Agent, or Firm* — MATTINGLY & MALUR, PC

(57) ABSTRACT

A memory stores an assistance pattern including a first periphery sensor map indicating a map in a periphery of a vehicle and an assistance content of driving assistance of the vehicle corresponding to the first periphery sensor map. A processor (sensor information acquisition unit 101) acquires sensor information indicating information on an object in the periphery of the vehicle sensed by a sensor. A processor (periphery sensor map acquisition unit 102) acquires a second periphery sensor map based on the sensor information. A processor (map similarity search unit 103, and assistance instruction unit 104) performs driving assistance of the assistance content corresponding to the first periphery sensor map when the second periphery sensor map is similar to the first periphery sensor map.

12 Claims, 15 Drawing Sheets

(51) Int. Cl.
*B60W 30/09* (2012.01)
*B60W 50/14* (2020.01)
*G06V 20/56* (2022.01)

(52) U.S. Cl.
CPC ... *B60W 2050/143* (2013.01); *B60W 2520/10* (2013.01); *B60W 2555/60* (2020.02); *B60W 2720/10* (2013.01)

(58) Field of Classification Search
CPC ....... B60W 30/09; G06V 20/56; G08G 1/166; G08G 1/167
See application file for complete search history.

(56) References Cited

U.S. PATENT DOCUMENTS

| 10,915,105 | B1* | 2/2021 | Likhterman | ...... B60W 60/0015 |
| 2007/0032929 | A1* | 2/2007 | Yoshioka | ............... G08G 1/166 701/1 |
| 2019/0381977 | A1* | 12/2019 | Kanagarajan | ........... B60T 8/171 |
| 2020/0094821 | A1* | 3/2020 | Kim | ................... B60W 30/0956 |
| 2020/0130577 | A1* | 4/2020 | Mitra | ........................ B60Q 9/00 |
| 2020/0189576 | A1* | 6/2020 | Ikezawa | ..................... B60T 7/12 |
| 2022/0196415 | A1* | 6/2022 | Sameer | ............. G01C 21/3461 |

FOREIGN PATENT DOCUMENTS

| JP | WO2016/166791 A1 | 7/2017 |
| JP | 2020-8888 A | 1/2020 |
| JP | 2020-15417 A | 1/2020 |

OTHER PUBLICATIONS

International Preliminary Report on Patentability received in corresponding International Application No. PCT/JP2022/003850 dated Oct. 26, 2023.
Japanese Office Action received in corresponding Japanese Application No. 2021-068939 dated Nov. 19, 2024.

* cited by examiner

FIG. 5A (ASSISTANCE DETERMINATION UNIT 106)

- START
- S501: ACQUIRE ASSISTANCE TARGET OPERATION LIST
- S502: HAS TARGET OPERATION BEEN DETECTED? — N → RETURN
- Y
- S503: ACQUIRE PERIPHERY SENSOR MAP
- S504: DETERMINE MAP SHAPE
- S505: IS THERE SHAPE FEATURE? — N → RETURN
- Y
- S506: NOTIFY PATTERN UPDATE UNIT OF REGISTRATION
- RETURN

FIG. 5B

ASSISTANCE TARGET OPERATION LIST

| OPERATION CRITERION | ASSISTANCE CONTENT | VALIDITY DETERMINATION CRITERION | PRIORITY |
|---|---|---|---|
| BRAKE OPERATION OF 0.3G OR MORE | ALARM | BRAKING IS EXECUTED AFTER ALARM | 1 |
| TRAVEL AT SPEED 50% LOWER THAN SPEED LIMIT | ALARM | SPEED IS DECREASED BEFORE ALARM | 2 |
| RESPONSE FREQUENCY OF OBSTACLE APPROACH ALARM IS ○○ TIMES OR MORE PER MINUTE | CHANGE ALARM PATTERN WHEN APPROACHING OBSTACLE | ALARM DOES NOT DECREASE | 3 |
| . . . | | | |

FIG. 9
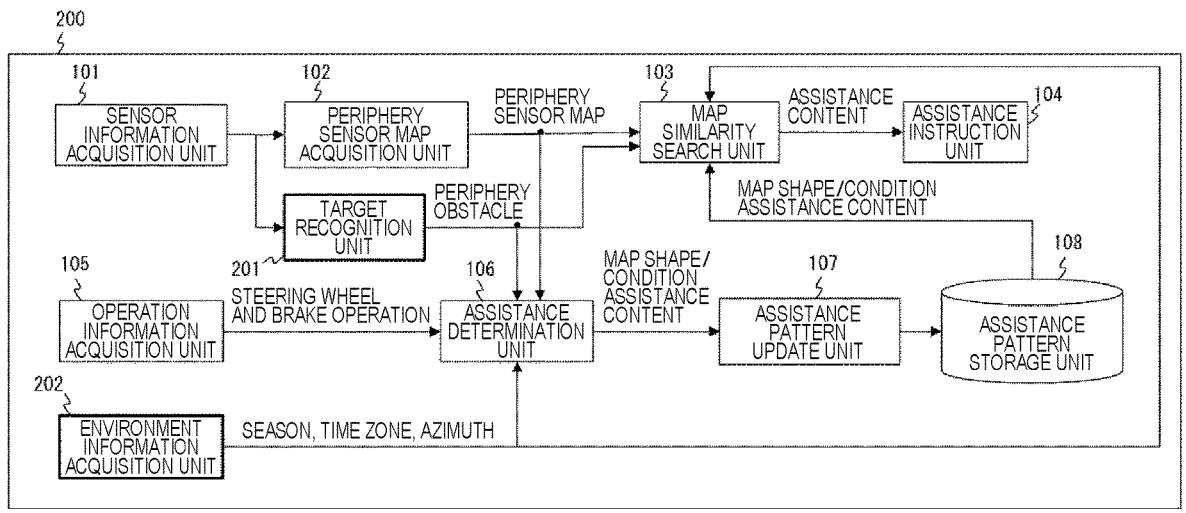
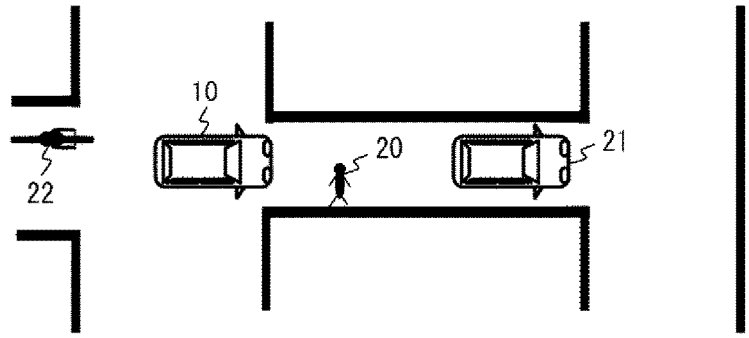
FIG. 10A
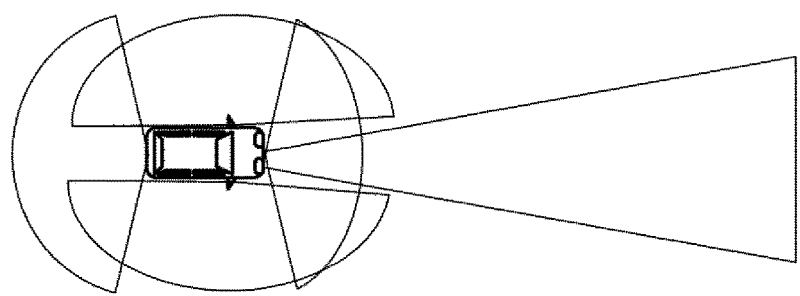
FIG. 10B
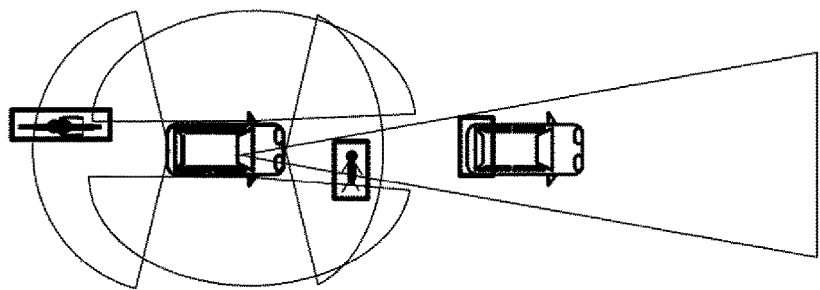
FIG. 10C

| No | BAD SCENE | USER SELECTION |
|---|---|---|
| 1 | INTERSECTION WITH BLIND SPOT | ASSISTANCE REQUIRED |
| 2 | OVERTAKING ON NARROW PATH AT DUSK | ASSISTANCE NOT REQUIRED |
| ... | | |

| No | MAP | TARGET | DATE/TIME | AZIMUTH | ASSISTANCE CONTENT | VALIDITY DETERMINATION CRITERION | PRIORITY |
|---|---|---|---|---|---|---|---|
| 1 | | | —/— | — | | | |
| 2 | | | ○ MONTH × DAY 16:00 | WEST | | | |
| ... | | | | | | | |

FIG. 15
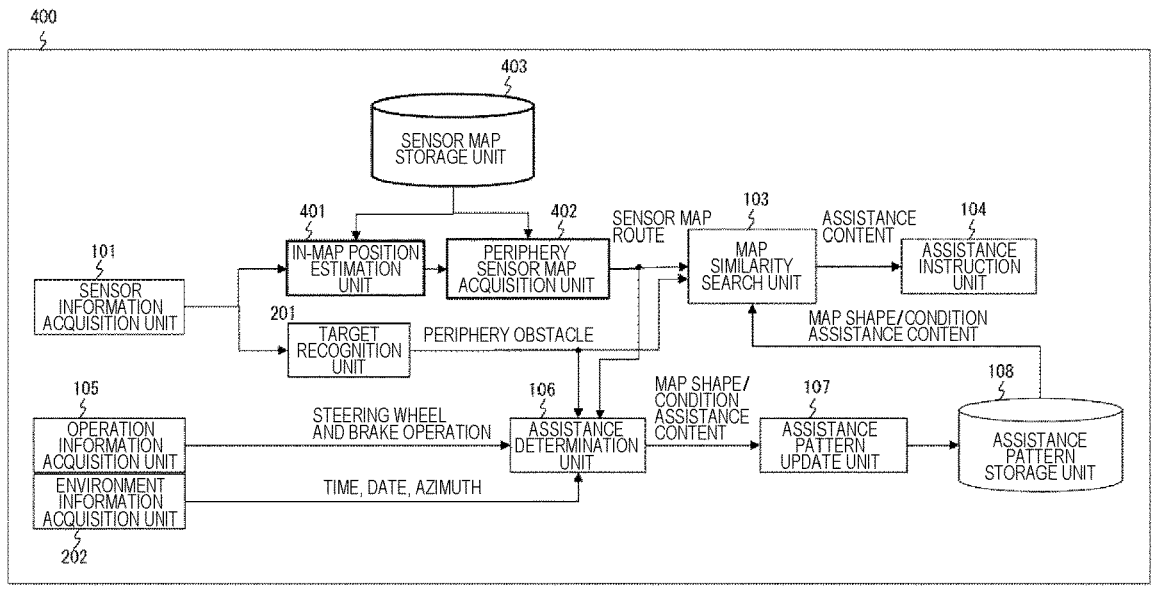
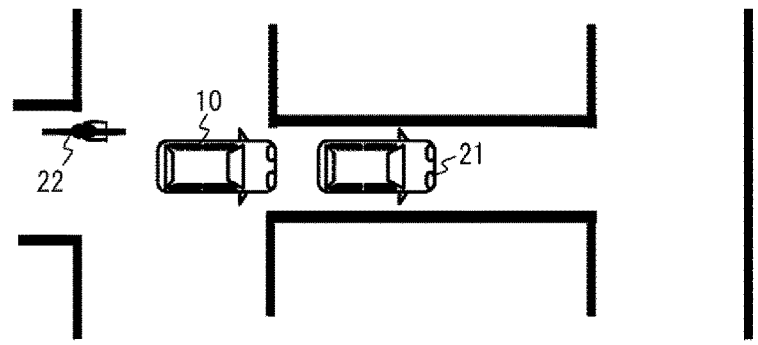
FIG. 16A
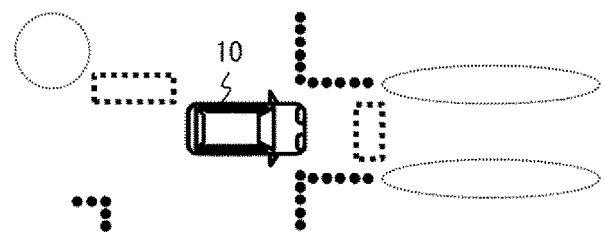
FIG. 16B
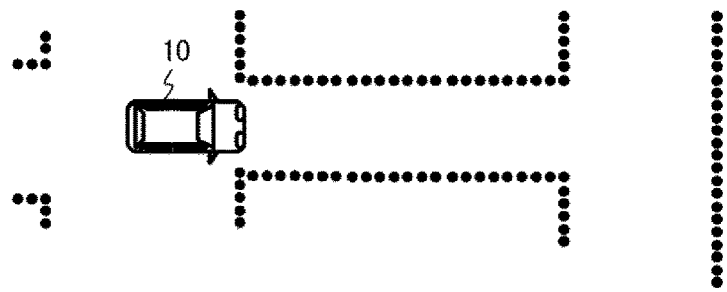
FIG. 16C

DRIVING ASSISTANCE DEVICE

TECHNICAL FIELD

The present invention relates to a driving assistance device.

BACKGROUND ART

As a technique for assisting safety of an automobile, there is a system that performs driving assistance such as an alarm under a registered position or a predetermined road condition based on map information such as a car navigation system.

PTL 1 discloses a system that detects a driver's near miss, records a detected position on a map, and performs driving assistance.

CITATION LIST

Patent Literature

PTL 1: JP 2007-047914 A

SUMMARY OF INVENTION

Technical Problem

However, driving assistance in a scene where a driver's near miss occurs should be executed not only at the place but also at a similar place.

The present invention has been made in view of the above problems, and an object of the present invention is to provide a driving assistance device capable of performing driving assistance when a vehicle travels in a place similar to a place requiring driving assistance.

Solution to Problem

In order to achieve the above object, a driving assistance device according to the present invention includes: a memory that stores an assistance pattern including a first periphery sensor map indicating a map in a periphery of a vehicle and an assistance content of driving assistance of the vehicle corresponding to the first periphery sensor map; and a processor that acquires sensor information indicating information of an object in the periphery of the vehicle sensed by a sensor, acquires a second periphery sensor map based on the sensor information, and performs driving assistance of the assistance content corresponding to the first periphery sensor map in a case where the second periphery sensor map is similar to the first periphery sensor map.

Advantageous Effects of Invention

According to the present invention, driving assistance can be performed when a vehicle travels in a place similar to place requiring a driving assistance. Problems, configurations, and effects other than those described above will be clarified by the following description of embodiments.

BRIEF DESCRIPTION OF DRAWINGS

FIG. 5A is a flowchart for describing an operation procedure of an assistance determination unit.

FIG. 5B is a diagram illustrating an assistance target operation list.

FIG. 9 is a functional block diagram of a driving assistance device according to a second embodiment.

FIG. 10A is a diagram illustrating an example of a peripheral environment of a host vehicle.

FIG. 10B is a diagram illustrating a sensing range of a camera mounted on the host vehicle in FIG. 10A.

FIG. 10C is a diagram illustrating pattern recognition of the camera mounted on the host vehicle in FIG. 10A.

FIG. 15 is a functional block diagram of a driving assistance device according to a fourth embodiment.

FIG. 16A is a diagram illustrating an example in which a two-wheeled vehicle or a vehicle exists in the periphery of the host vehicle.

FIG. 16B is a diagram illustrating an example in which a sensing range is limited by a target.

FIG. 16C is a diagram illustrating periphery terrain information acquired by a periphery sensor map acquisition unit.

DESCRIPTION OF EMBODIMENTS

First Embodiment

Figure 1:
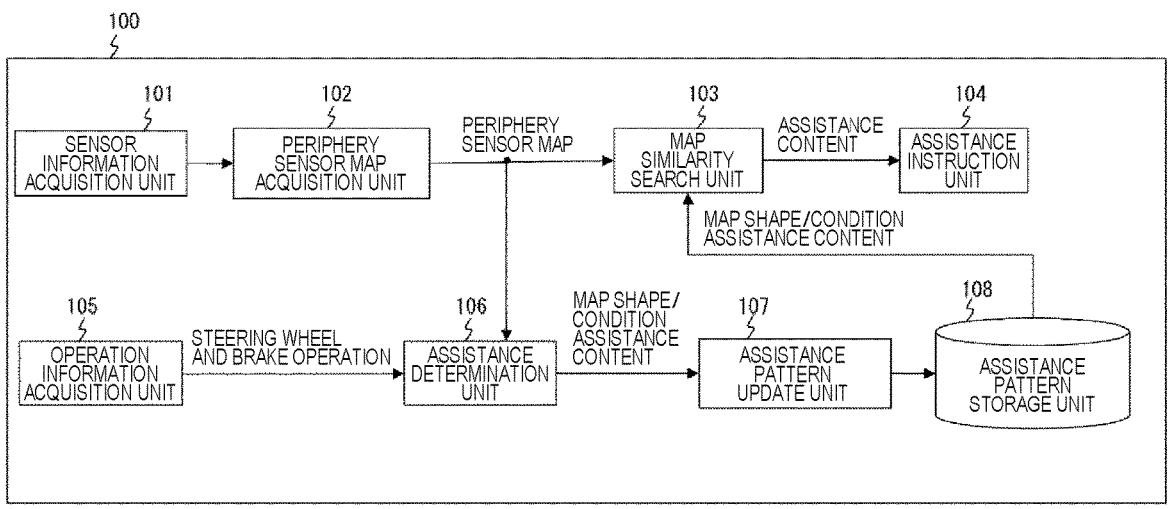
FIG. 1 is a functional block diagram of a driving assistance device according to a first embodiment.

Hereinafter, a first embodiment of the present invention will be described in detail with reference to the drawings. FIG. 1 is a block diagram of a driving assistance device 100 according to a first embodiment.

The driving assistance device 100 is incorporated in an integrated controller or the like mounted on a vehicle (FIG. 2A, host vehicle 10) to assist driving, and in the present embodiment, is set to assist driving based on a result of sensing by a camera attached in the periphery of the vehicle.

The driving assistance device 100 is configured by a computer including a central processing unit (CPU), a memory, an input/output (I/O) device, and the like. Predetermined processing is programmed, and the processing is repeatedly executed at a predetermined cycle T. In the present embodiment, the CPU, the memory, and the like cooperate to implement the following functions.

As illustrated in FIG. 1, the driving assistance device 100 includes a sensor information acquisition unit 101, a periphery sensor map acquisition unit 102, a map similarity search unit 103, an assistance instruction unit 104, an operation information acquisition unit 105, an assistance determination unit 106, an assistance pattern update unit 107, and an assistance pattern storage unit 108.

Figure 2A:
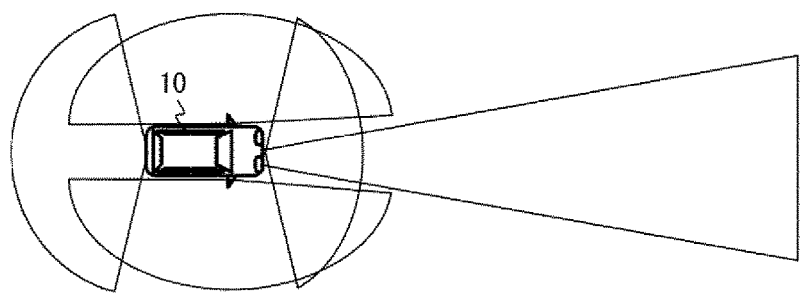
FIG. 2A is a schematic diagram illustrating sensing ranges of five sensors mounted on a host vehicle.
Figure 2B:
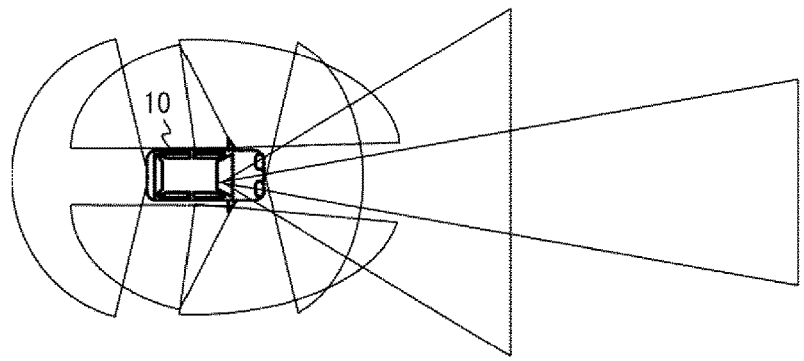
FIG. 2B is a schematic diagram illustrating sensing ranges of seven sensors mounted on the host vehicle.

The sensor information acquisition unit 101 acquires a distance to an object in the periphery of the host vehicle. For example, as illustrated in FIGS. 2A and 2B, the sensor information acquisition unit 101 acquires a distance to an object in the periphery of the host vehicle and a point group from a sensor such as a camera, a radar, a LiDAR, or a sonar attached to a position where the object in the periphery of the host vehicle 10 can be detected. In the present embodiment, a distance from a camera attached in the periphery of the host vehicle to periphery obstacles and a point group are acquired.

FIG. 2A illustrates an example in which five cameras are mounted on the host vehicle 10, and FIG. 2B illustrates an example in which seven cameras are mounted on the host vehicle 10. The distance and the point group are obtained by calculating parallax in a case of a stereo camera. In a case of a monocular camera, the distance and the point group can be acquired by a principle of motion stereo by the movement of the host vehicle. Hereinafter, it is assumed that the point group is represented by PT [c] [p]=(X, Y, Z). Here, c is an ID of a camera, p is an ID of a point group, and each of X, Y, and Z is a coordinate value in a relative coordinate system from a sensor obtained as a result of measurement.

The periphery sensor map acquisition unit 102 integrates the point group PT [c] [p] obtained by the sensor, and generates a map MP [x] [y] representing a periphery terrain. In the present embodiment, it is assumed that the map MP [x] [y] is two-dimensional data. First, a distance point group PT [c] [p] acquired from each sensor is converted into relative coordinates from a center of the host vehicle based on attachment information (external parameter) of each sensor to the host vehicle. It is assumed that the attachment information to the host vehicle is measured in advance.

Figure 3A:
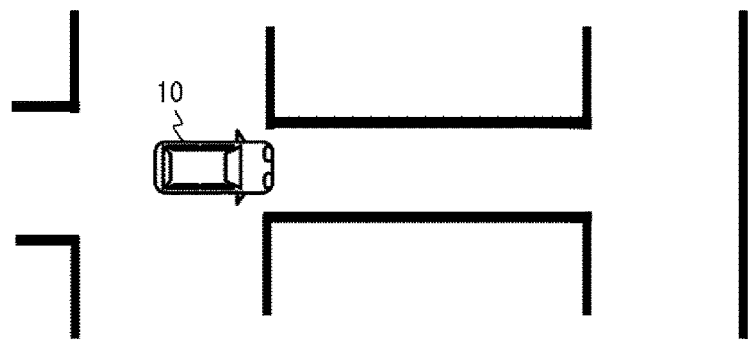
FIG. 3A is a diagram illustrating an example of a peripheral environment of the host vehicle.
Figure 3B:
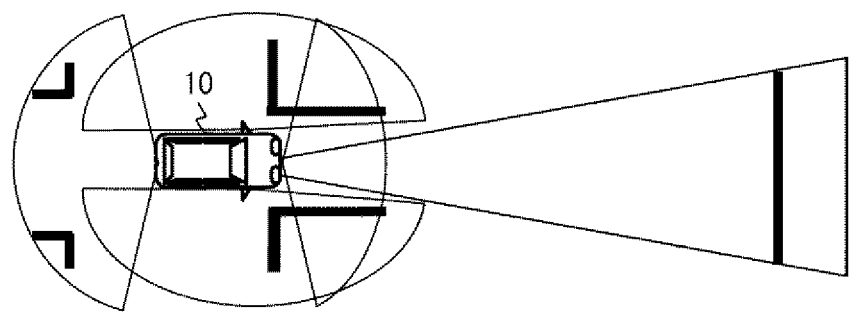
FIG. 3B is a diagram illustrating a sensing result of a sensor mounted on the host vehicle in FIG. 3A.
Figure 3C:
FIG. 3C is a diagram illustrating a periphery sensor map acquired by a periphery sensor map acquisition unit.

Next, it is assumed that point group information existing at a position higher than a road surface is extracted from the converted distance point group PTR [c] [p], and used as a binary image pattern MP [x] [y] plotted at the position (x, y) obtained by converting the relative coordinates (X, Y) excluding the height of the extracted point group at a constant scale. FIGS. 3A, 3B, and 3C illustrate this processing. In the environment of FIG. 3A, in a case where the host vehicle 10 has a sensor configuration of FIG. 2A, a sensing result as illustrated in FIG. 3B is obtained. FIG. 3C is a plot of all the point groups obtained from these sensors. Further, a map in which time-series information is accumulated, such as an occupancy probability map, may be used.

The assistance pattern storage unit 108 illustrated in FIG. 1 is a random access memory (RAM) region in which an assistance pattern PTN [n] is stored. Here, n is an ID for appropriate management when a plurality of assistance patterns PTN are stored. It is assumed that the assistance pattern PTN [n] includes a valid flag V, a map MP [x] [y], an assistance function ASS, a validity determination criterion CND, and a priority PR as a data structure.

The map similarity search unit 103 compares a similarity between the map MP [x] [y] and the map MP [x] [y] in the assistance pattern PTN [n]. When the similarity between the map MP and the map MP in any one of the assistance patterns PTN [n] is high, the assistance instruction unit 104 is notified to execute the corresponding assistance content. Details of the processing will be described later.

The assistance instruction unit 104 instructs another controller or actuator in the vehicle to execute driving assistance corresponding to the assistance function ASS in the assistance pattern PTN [n] determined to have a high similarity by the map similarity search unit 103.

The operation information acquisition unit 105 acquires information regarding driver's operation of a steering wheel, an accelerator, and a brake. These pieces of information may be acquired by directly inputting a signal of a sensor to the driving assistance device 100 or by performing communication using a local area network (LAN).

The assistance determination unit 106 determines whether driving assistance is necessary from the driving operation acquired by the operation information acquisition unit 105. Whether driving assistance is necessary is determined in accordance with a list of what kind of assistance is necessary when what kind of operation is performed, such as necessity of alarm assistance when sudden braking operation is performed, which is held in advance. When it is determined that driving assistance is necessary, the map MP generated by the periphery sensor map acquisition unit 102 is acquired and notified to the assistance pattern update unit together with the corresponding assistance content. Details of the processing will be described later.

When notified from the assistance determination unit 106, the assistance pattern update unit 107 registers the map and the assistance content in the assistance pattern storage unit. In addition, validity of the assistance content is determined, and for the assistance determined to be less valid, processing of invalidating the assistance pattern in the assistance pattern storage unit is also performed. Details of the processing will be described later.

[Description of Processing of Map Similarity Search Unit 103]

Figure 4:
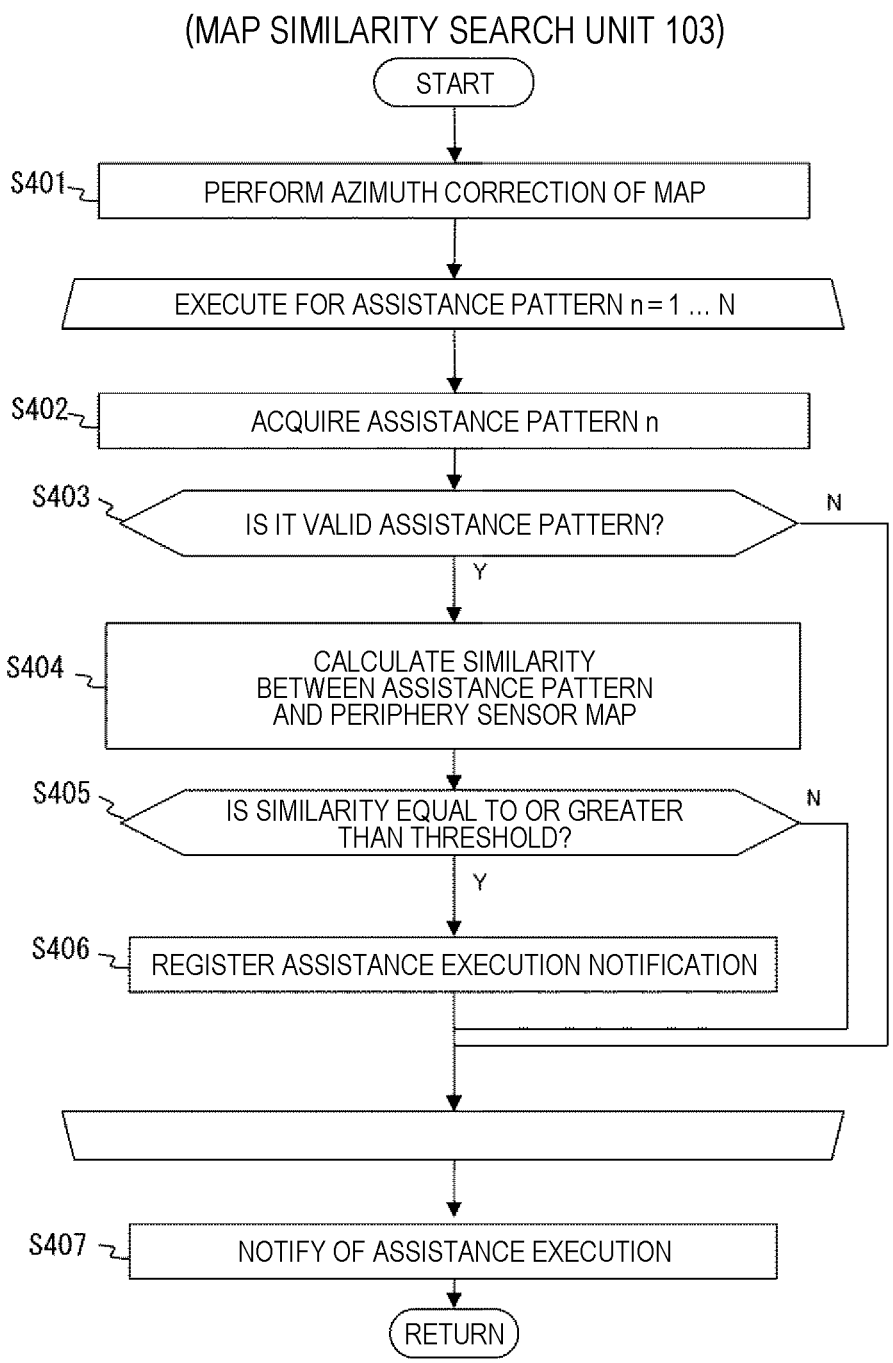
FIG. 4 is a flowchart for describing an operation procedure of a map similarity search unit.

The contents of processing in the map similarity search unit 103 will be described with reference to FIG. 4. FIG. 4 is a flowchart illustrating a flow of processing of the map similarity search unit 103.

First, in step S401, azimuth correction of the map MP is performed. This processing is processing for, when time-series information is accumulated as in the occupancy probability map, in a case where the map MP is generated in a coordinate system in which an azimuth of the host vehicle is fixed in order to shorten a processing time, enabling calculation a similarity between the maps even in different directions by unifying the azimuth of the host vehicle in a predetermined direction. In the present embodiment, correction is performed such that the host vehicle is directed upward on the map MP.

Next, steps S402 to S405 are executed for all n=1 to N of the assistance patterns PTN [n]. First, in step S402, the assistance pattern PTN [n] is acquired from the assistance pattern storage unit 108. As described above, the assistance pattern PTN [n] has the validity flag V, the map MP, the assistance function ASS, the validity determination criterion CND, and the priority PR as data.

Further, in step S403, it is determined whether the assistance pattern PTN [n] is valid by using the valid flag V of the assistance pattern PTN [n]. The valid flag V is set by the assistance pattern update unit 107 to be described later. In a case where the assistance pattern is valid, the processing proceeds to step S404. In a case where the assistance pattern is invalid, the processing returns to step S402 in order to read a next assistance pattern.

When the assistance pattern is valid, a similarity SML [n] between the map MP in the assistance pattern PTN [n] and the periphery sensor map MP is calculated in step S404. Since the map MP in the assistance pattern PTN [n] and the periphery sensor map MP are two-dimensional image patterns, the similarity calculation is executed by using a method of calculating the similarity of a simple image such as SAD or SSD.

The similarity SML [n] obtained as the calculation result is calculated such that the similarity SML [n] becomes a value close to 1 as both patterns are similar to each other, and the similarity SML [n] becomes a value close to 0 as both patterns are not similar to each other. Note that for the similarity calculation, a method of detecting feature points such as SIFT and calculating the similarity between the feature points in order to cope with a difference in fine shapes may be used.

In step S405, it is determined whether the similarity SML [n] is equal to or greater than a threshold TH_SML. In a case where the similarity SML [n] is equal to or greater than a threshold, the processing proceeds to step S406, and the assistance content is registered in a table TBL for notifying the assistance determination unit 106 to execute the assistance function ASS in the assistance pattern PIN [n].

After steps S402 to S406 are executed for all n=1 to N, the registered contents of the table TBL for notifying the assistance determination unit 106 are confirmed in step S407. In a case where a plurality of assistance contents are registered, the assistance determination unit 106 is notified to execute contents with a highest priority based on the priority PR of the assistance contents. It is assumed that the priority PR is set according to the content of assistance, and a priority is set to be high for an intervention in vehicle control such as deceleration, and a priority is set to be low for a notification such as an alarm.

[Description of Processing of Assistance Determination Unit 106]

Contents of processing in the assistance determination unit 106 will be described with reference to FIGS. 5A and 5B. FIG. 5A is a flowchart illustrating a flow of processing of the assistance determination unit 106.

First, in step S501, an assistance target operation list LST as a target of assistance determination is acquired. In the assistance target operation list LST, an operation criterion TRG (operation information), an assistance function ASS (assistance content), a validity determination criterion CND, and a priority PR are described. In the present embodiment, as illustrated in FIG. 5B, it is assumed that sudden braking operation, traveling at a speed lower than the speed limit, and a reaction frequency of an obstacle approach alarm of a certain value or more are registered as operation criteria of the assistance target operation list LST.

Next, in step S502, it is determined whether an operation that meets the operation criterion TRG of the assistance target operation list LST has been detected. When it has been detected, the processing proceeds to step S503. In a case where it has not been detected, the processing waits until a next processing cycle.

In step S503, the periphery sensor map MP generated by the periphery sensor map acquisition unit 102 is acquired. Next, in step S504, a shape of the periphery sensor map MP is determined. The shape determination determines complexity in the map MP. For example, in a case where there is no object at all or there are not many objects in the map, information of the map MP is reduced, and erroneous detection is likely to occur in the map similarity search unit 103.

Therefore, the map MP is quantified by a ratio of pixels where an object exists, complexity used for texture analysis, and the like. When this value is equal to or greater than a certain value in step S505, the processing proceeds to step S506, and the assistance pattern update unit 107 is notified of the assistance pattern PTN including the map MP, the assistance content ASS described in the assistance target operation list LST, and the validity determination criterion CND as a set.

[Description of Processing of Assistance Pattern Update Unit 107]

Figure 6:
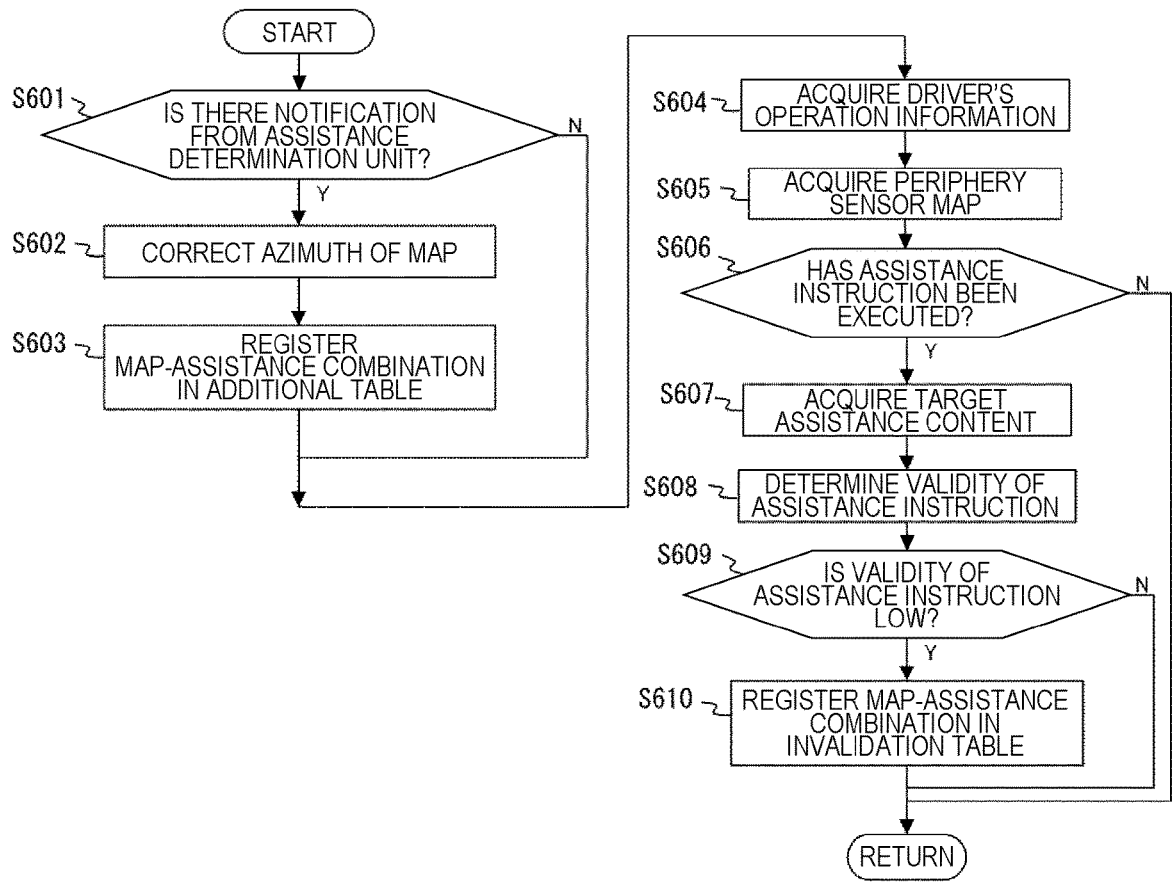
FIG. 6 is a flowchart for describing an operation procedure of an assistance pattern update unit.
Figure 7A:
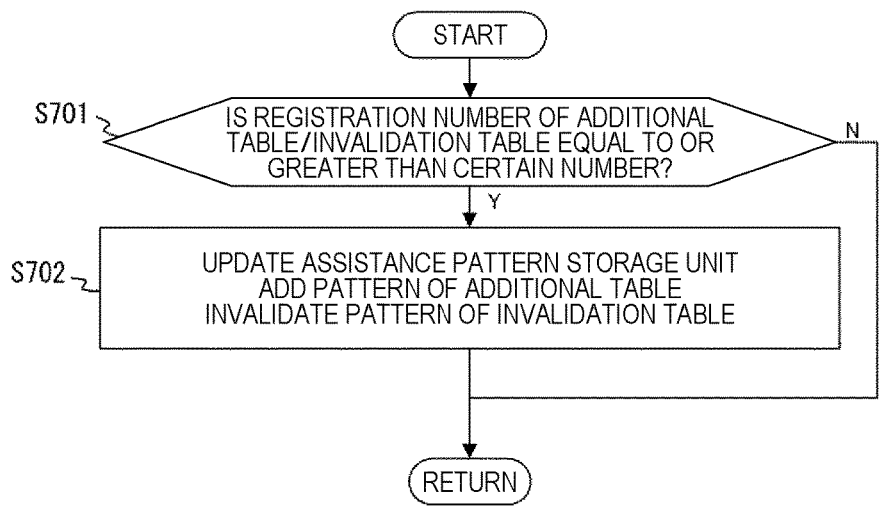
FIG. 7A is a flowchart illustrating an update method of the assistance pattern update unit.
Figure 7B:
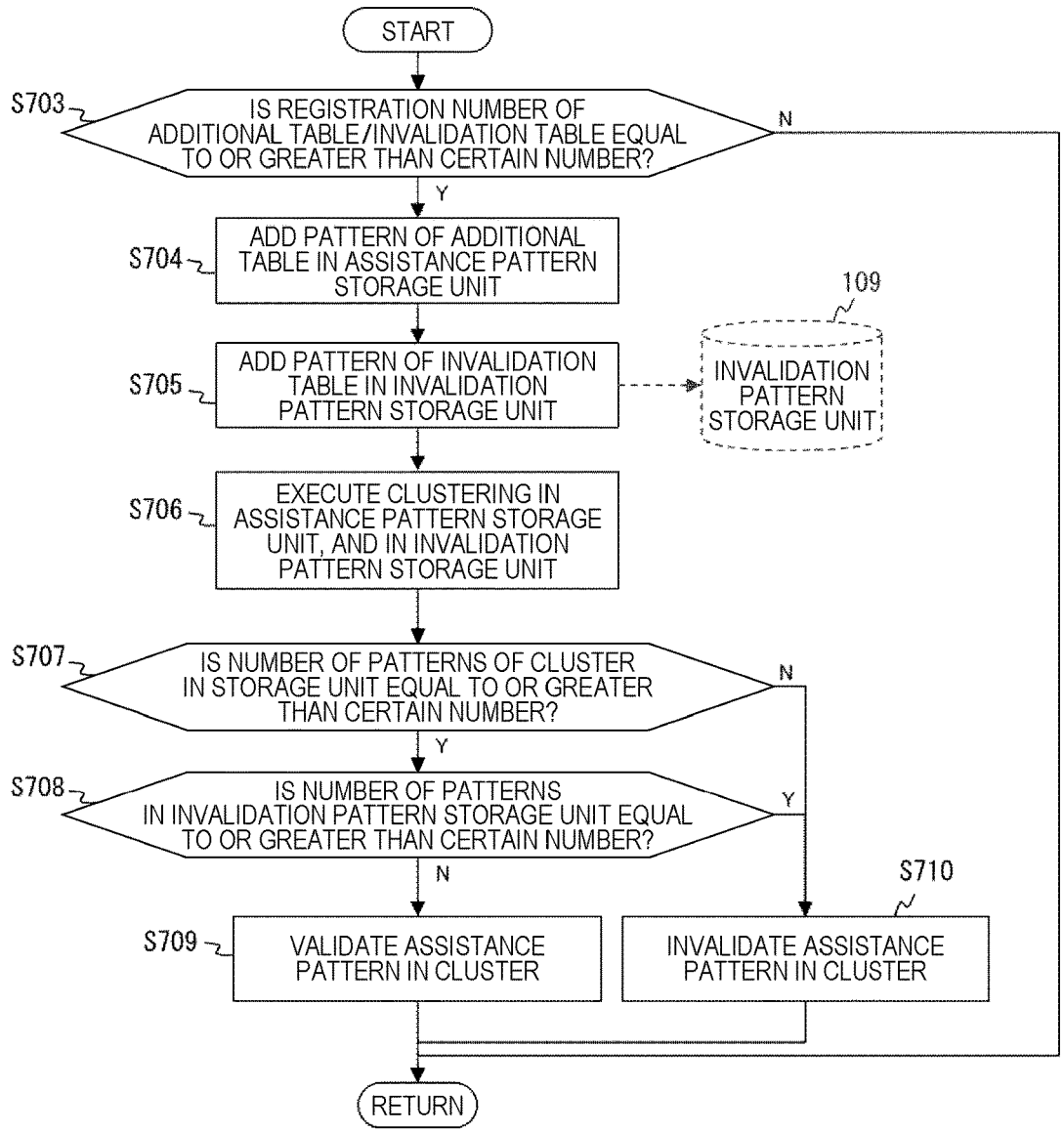
FIG. 7B is a flowchart illustrating another update method of the assistance pattern update unit.

Contents of processing in the assistance pattern update unit 107 will be described with reference to FIGS. 6, 7A, and 7B. FIG. 6 is a flowchart illustrating a flow of processing of the assistance pattern update unit 107. FIGS. 7A and 7B are flowcharts illustrating a flow of processing related to an update method of the assistance pattern update unit 107.

First, in step S601, the presence or absence of a notification from step S506 of the assistance determination unit 106 is confirmed, and in a case where there is a notification, the processing proceeds to step S602. In a case where there is no notification, the processing proceeds to step S604.

In step S602, the map MP is acquired and azimuth correction is performed. This is similar to the processing in step S401 described above. This is processing for enabling calculation of a similarity between maps even in different directions by unifying the azimuth of the host vehicle in a predetermined direction in a case where the map MP is generated in a coordinate system in which the azimuth of the host vehicle is fixed in order to shorten the processing time when time-series information is accumulated as in the occupancy probability map. In the present embodiment, correction is performed such that the host vehicle is directed upward on the map MP.

Next, in step S603, the map MP, the assistance content ASS, and the validity determination criterion CND are registered as an assistance pattern PTN [a] in an additional table TBL_A added to the assistance pattern storage unit 108.

Step S604 and subsequent steps are processing of invalidating the registered assistance pattern. First, in step S604, driver's operation information is acquired from the operation information acquisition unit 105. Next, in step S605, the periphery sensor map MP is acquired.

In step S606, it is determined whether the assistance instruction unit 104 has issued an assistance instruction. In a case where the instruction has been performed, the processing proceeds to step S607. In a case where the instruction has not been performed, the processing waits until the next processing cycle.

In step S607, the executed assistance content ASS and the validity determination criterion CND are acquired from the assistance pattern storage unit 108. Then, in step S608, validity of the assistance instruction is determined based on the validity determination criterion CND.

The validity of the assistance instruction varies depending on the assistance content. However, as long as an alarm is issued, the assistance instruction can be determined to be valid when the brake is stepped on after the alarm timing, and the assistance instruction can be determined to be invalid when the brake is stepped on before the alarm timing. This may be a binary value of valid/invalid, or may be, for example, a continuous value of 0.0 to 1.0, and the closer to 1.0, the more valid it is.

In step S609, when it is determined that the validity is low by using the assistance instruction validity, the processing proceeds to step S610. Otherwise, the processing waits until the next processing cycle.

In step S610, the map MP of the assistance pattern, the assistance content ASS, and the validity determination criterion CND in the corresponding assistance pattern storage unit 108 are registered in an invalidation table TBL_I as an assistance pattern PTN [b] to be invalidated.

After the above processing is executed, the processing is reflected in the assistance pattern storage unit 108 according to the method illustrated in FIGS. 7A and 7B. FIGS. 7A and 7B illustrate different reflection methods.

A first registration method will be described with reference to FIG. 7A. First, in step S701, it is determined whether the registration numbers of the additional table TBL_A and the invalidation table TBL_I are equal to or greater than a certain number, and in a case where the registration number is equal to or greater than the certain number, step S702 is performed. Otherwise, the processing waits until the next processing cycle.

In step S702, the content of the additional table TBL_A is registered in the assistance pattern storage unit 108 as a new assistance pattern. Further, the content of the invalidation table TBL_I is extracted from the assistance pattern storage unit 108, and an invalidation flag is added.

Next, a different registration method will be described with reference to FIG. 7B. First, in step S703, it is determined whether the registration numbers of the additional table TBL_A and the invalidation table TBL_I are equal to or greater than a certain number, and in a case where the registration number is equal to or greater than the certain number, step S704 is performed. Otherwise, the processing waits until the next processing cycle.

In step S704, the content of the additional table TBL_A is registered in the assistance pattern storage unit 108 as a new assistance pattern. Next, in step S705, the content of the invalidation table TBL_I is stored in the invalidation pattern storage unit 109. The invalidation pattern storage unit 109 is a storage region different from the assistance pattern storage unit 108.

Then, in step S706, clustering using the shape of the map MP is executed in the assistance pattern storage unit 108 and the invalidation pattern storage unit 109. As a result of the clustering, a group PTG [j] of similar patterns in the assistance pattern storage unit 108 is generated. Similarly, a group PTIG [k] of similar patterns in the invalidation pattern storage unit 109 is generated. A similarity between the group PTG [j] in the assistance pattern storage unit 108 and the group PTIG [k] in the invalidation pattern storage unit 109 is also calculated.

In step S707, first, it is determined whether the number of patterns of the group PTG [j] in the assistance pattern storage unit 108 is equal to or greater than a certain number. In a case where the number is equal to or greater than the certain number, the processing proceeds to step S708. In a case where the number is less than the certain number, the processing proceeds to step S710.

In step S708, the group PTIG [k] in the invalidation pattern storage unit 109 having a high similarity to the group PTG [j] in the assistance pattern storage unit 108 calculated in step S706 is referred to, and it is determined whether the number of patterns is equal to or greater than a certain number. When the similarity to the group PTG [j] in the assistance pattern storage unit 108 is less than a certain level, the number of patterns is assumed to be 0. As a result, in a case where the number is equal to or greater than the certain number, the processing proceeds to step S710. In a case where the number is less than the certain number, the processing proceeds to step S709.

Step S709 is executed when the number of patterns of the group PTG [j] in the assistance pattern storage unit 108 is equal to or greater than a certain number and the number of patterns of the group PTIG [k] in the corresponding invalidation pattern storage unit 109 is less than the certain number. The valid flag V of the assistance pattern PTN [n] belonging to the group PTG [j] in the assistance pattern storage unit 108 is set to "valid".

Step S710 is executed when the number of patterns of the group PTG [j] in the assistance pattern storage unit 108 is less than a certain number or the number of patterns of the group PTIG [k] in the corresponding invalidation pattern storage unit 109 is equal to or greater than a certain number.

The valid flag V of the assistance pattern PTN [n] belonging to the group PTG [j] in the assistance pattern storage unit 108 is set to "invalid".

Figure 8A:
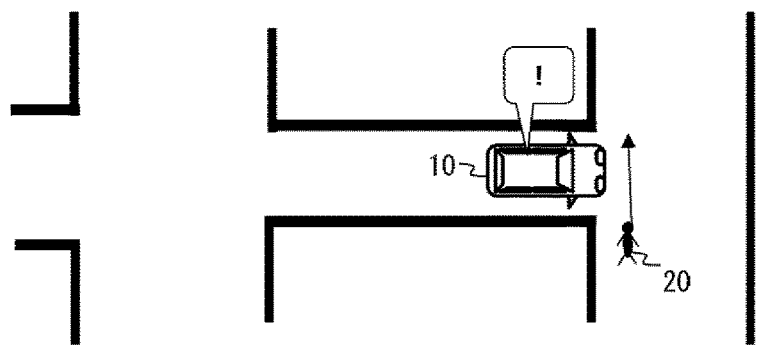
FIG. 8A is a diagram illustrating an example in which a pedestrian suddenly jumps out and a driver suddenly brakes.
Figure 8B:
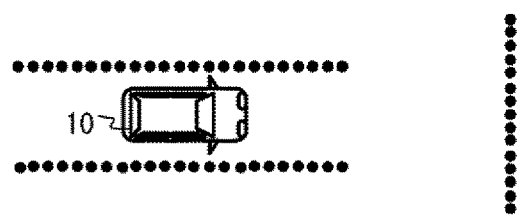
FIG. 8B is a diagram illustrating a periphery sensor map in the example of FIG. 8A.

A specific example of the first embodiment described above will be described with reference to FIGS. 8A to 8F. FIG. 8A illustrates an example in which, when the host vehicle 10 goes out to an intersection with poor visibility, a pedestrian 20 suddenly jumps out and the driver suddenly brakes. The map MP at the timing of sudden braking is stored as the assistance pattern PTN [n] as illustrated in FIG. 8B. Then, when the vehicle approaches a similar intersection, an alarm can be executed as the assistance function ASS, and attention can be attracted to the driver.

Figure 8C:
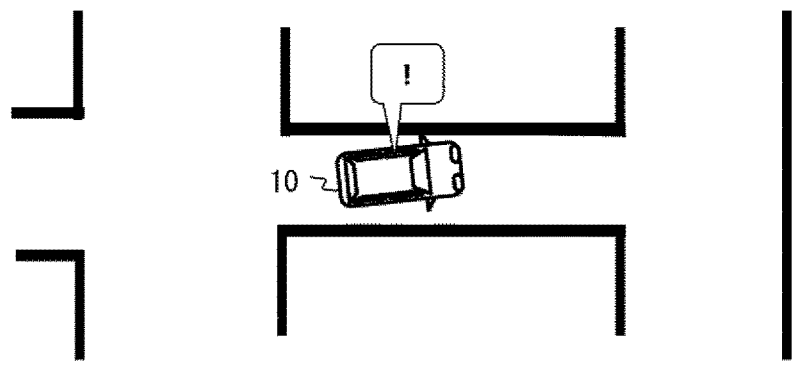
FIG. 8C is a diagram illustrating an example in which a speed suddenly decreases when a vehicle travels on a narrow path.
Figure 8D:
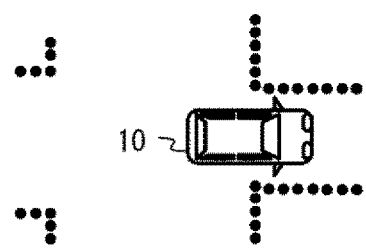
FIG. 8D is a diagram illustrating a periphery sensor map in the example of FIG. 8C.

FIG. 8C illustrates an example in which the speed suddenly decreases when the driver travels on a narrow path. By acquiring the speed of a travel path from a navigation or a sign recognition function of an external recognition sensor, it is compared with the host vehicle speed, it is detected that the speed is equal to or less than a certain ratio, and the map MP is stored as illustrated in FIG. 8D. Then, when entering a similar road, an alarm can be executed as the assistance function ASS, and attention can be attracted to the driver.

Figure 8E:
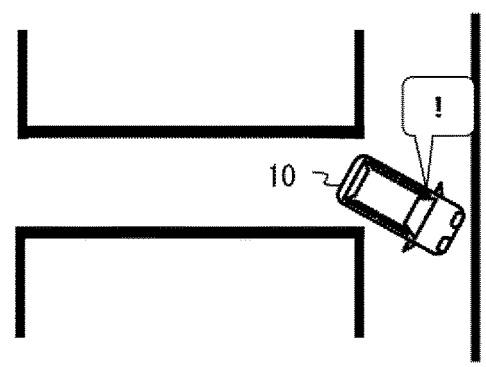
FIG. 8E is a diagram illustrating an example of traveling near a wall when turning at a narrow intersection.
Figure 8F:
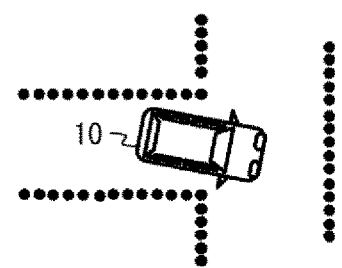
FIG. 8F is a diagram illustrating a periphery sensor map in the example of FIG. 8E.

FIG. 8E illustrates an example in which the driver travels near a wall when turning at a narrow intersection. The map MP is stored as illustrated in FIG. 8F by detecting a distance to an obstacle and acquiring information of a system that issues an alarm of obstacle approach when the distance is equal to or less than a certain value as operation information of the driver. Then, when the vehicle enters a similar road, it is possible to prompt the driver to execute an early turning operation by executing an obstacle approach alarm earlier than usual as the assistance function ASS.

The features of the present embodiment can also be summarized as follows.

The driving assistance device includes at least a memory (FIG. 1, assistance pattern storage unit 108) and a processor (CPU). The memory stores an assistance pattern PTN including a first periphery sensor map (map MP) indicating a map in the periphery of the vehicle (host vehicle 10) and an assistance content (assistance function ASS) of driving assistance of the vehicle corresponding to the first periphery sensor map (map MP).

The processor (sensor information acquisition unit 101) acquires sensor information indicating information on an object in the periphery of the vehicle sensed by the sensor. The processor (the periphery sensor map acquisition unit 102) acquires a second periphery sensor map (map MP) based on the sensor information. In a case where the second periphery sensor map (map MP) is similar to the first periphery sensor map (map MP), the processor (map similarity search unit 103, and assistance instruction unit 104) performs driving assistance of the assistance content (assistance function ASS) corresponding to the first periphery sensor map (map MP). As a result, driving assistance can be performed when the vehicle travels in a place similar to a place requiring driving assistance.

The memory stores a list (assistance target operation list LST) including operation information (FIG. 5B, operation criterion TRG) indicating an operation state requiring driving assistance and an assistance content (assistance function ASS) corresponding to the operation information (operation criterion TRG). When the operation state indicated by the operation information (operation criterion TRG) is detected, the processor (assistance determination unit 106, assistance pattern update unit 107) registers/updates the assistance pattern PTN with a set of the second periphery sensor map (map MP) and the assistance e content (assistance function ASS) corresponding to the operation information (operation criterion TRG). As a result, with the detection of the operation state requiring the driving assistance as a trigger, the assistance content is associated with the first periphery sensor map.

The operation state indicated by the operation information (operation criterion TRG) is, for example, a state where the sudden braking operation is performed (FIG. 5B, row of priority 1). The assistance content (assistance function ASS) corresponding to the operation information (operation criterion TRG) is, for example, an alarm or control of deceleration or acceleration suppression. As a result, with the detection of the sudden braking operation as a trigger, the assistance content is associated with the first periphery sensor map. Then, when the vehicle travels in a place similar to the place where the sudden braking operation has been detected in the past, an alarm or control of deceleration or acceleration suppression can be performed as driving assistance.

In addition, the operation state indicated by the operation information (operation criterion TRG) is, for example, a state in which a traveling speed of the vehicle (host vehicle 10) is slower than the speed limit at a traveling position of the vehicle (FIG. 5B, row of priority 2). The assistance content (assistance function ASS) corresponding to the operation information (operation criterion TRG) is, for example, an alarm or control of deceleration or acceleration suppression. As a result, with the detection of a state slower than the speed limit as a trigger, the assistance content is associated with the first periphery sensor map. Then, in a case where the vehicle travels in a place similar to the place where the state slower than the speed limit has been detected in the past (bad scene), an alarm (proposal to reduce the speed) or control of deceleration or acceleration suppression can be performed as driving assistance.

Further, the operation state indicated by the operation information (operation criterion TRG) is, for example, a state where a frequency of driving assistance is higher than a predetermined value (FIG. 5B, row of priority 3). The assistance content (assistance function ASS) corresponding to the operation information (operation criterion TRG) is, for example, a change of a parameter for adjusting a function of driving assistance. As a result, with the detection of a state in which the frequency of driving assistance is higher than the predetermined value as a trigger, the assistance content is associated with the first periphery sensor map. Then, in a case where the vehicle travels in a place similar to the place where the state in which the frequency of driving assistance (for example, obstacle approach alarm caused by traveling near an obstacle) is high is detected in the past, a parameter for adjusting the function of driving assistance as driving assistance can be changed (for example, the parameter is changed to issue the obstacle approach alarm earlier).

In the present embodiment, the processor (FIG. 1, periphery sensor map acquisition unit 102) generates a second periphery sensor map (map MP) based on the sensor information. As a result, for example, even when there is a change in the shape of the road, the obstacle, and the like, it is possible to perform necessary driving assistance.

The processor (FIG. 1, assistance pattern update unit 107, map similarity search unit 103, and assistance instruction unit 104) clusters the first periphery sensor map (map MP) (FIG. 7B, S706), and when the number of the first periphery sensor maps (maps MP) in the cluster is equal to or greater than a certain number (FIG. 7B, S707: YES), performs driving assistance of an assistance content (assistance function ASS) corresponding to the first periphery sensor map (map MP) in the cluster. As a result, for example, an accuracy of the place requiring driving assistance is improved.

In the present embodiment, the list (FIG. 5B, assistance target operation list LST) includes a determination criterion (validity determination criterion CND) for determining validity/invalidity of the driving assistance corresponding to the assistance content (assistance function ASS). The processor (assistance pattern update unit 107) determines the validity/invalidity of the driving assistance based on the determination criterion (validity determination criterion CND) corresponding to the assistance content (assistance function ASS) for which the driving assistance has been performed (FIG. 6, S608).

When the first periphery sensor map (map MP) corresponding to the assistance content determined to be invalid in the cluster is less than a certain number (FIG. 7B, S708: NO), the processor (assistance pattern update unit 107, map similarity search unit 103, and assistance instruction unit 104) performs driving assistance of the assistance content (assistance function ASS) corresponding to the first periphery sensor map (map MP).

On the other hand, when the number of the first periphery sensor maps corresponding to the assistance content determined to be invalid in the cluster is equal to or greater than a certain number (FIG. 7B, S708: YES), the processor (assistance pattern update unit 107, map similarity search unit 103, and assistance instruction unit 104) does not perform the driving assistance of the assistance content corresponding to the first periphery sensor map. Thus, only valid driving assistance can be performed to the driver.

As described above, it is possible to provide a system that generates a map MP using distance information of an object detected in the periphery of the host vehicle and performs driving assistance based on a similarity to an assistance pattern PTN [n] similar to the map, in which execution necessity of the driving assistance is determined from a driving operation of a driver, and the map MP when the driving operation satisfying a condition is executed and an assistance content corresponding to the driving operation are registered as the assistance pattern PTN [n], so that appropriate driving assistance can be executed based on the driver's past experience.

Second Embodiment

Next, a second embodiment of an in-vehicle driving assistance device of the present invention will be described below with reference to the drawings.

FIG. 9 is a block diagram illustrating a configuration of a driving assistance device 200 according to a second embodiment. In the following description, only portions different from the driving assistance device 100 in the above-described first embodiment will be described in detail, and the same portions will be denoted by the same reference numerals, and a detailed description thereof will be omitted.

The present embodiment is characterized in that information on periphery obstacles obtained by a target recognition unit 201 is also considered, and that information on a time, a date, and an azimuth obtained by an environment information acquisition unit 202 is considered.

The target recognition unit 201 recognizes a target OBJ [m] such as a periphery vehicle, a two-wheeled vehicle, or a pedestrian from a point group PT [c] [p] obtained by the sensor. It is assumed that the target OBJ [m] has relative coordinates (X, Y) from the host vehicle and a target type (a vehicle, a pedestrian, and a two-wheeled vehicle) as a data structure.

Figure 10D:
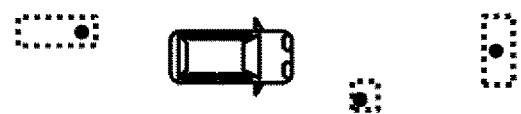
FIG. 10D is a diagram illustrating a target recognized by a target recognition unit.

In the present embodiment, since a camera is used as a sensor, a result of pattern recognition of the camera is acquired, and a point group identified as a vehicle, a two-wheeled vehicle, or a pedestrian is recognized as the target OBJ [m]. FIGS. 10A to 10D are examples of processing contents (detection results) of the target recognition unit 201. In the environment as illustrated in FIG. 10A, in a case where a camera that recognizes the periphery of the host vehicle 10 is mounted as illustrated in FIG. 10B, the camera performs pattern recognition as illustrated in FIG. 10C, and acquires the target OBJ [m] as illustrated in FIG. 10D. As a result, when calculating a similarity SML in step S404 by the map similarity search unit 103, it is possible to perform processing in consideration of not only the information of the periphery sensor map but also the information of the target.

The environment information acquisition unit 202 acquires information such as a date, a time, and an azimuth. These pieces of information are obtained through communication with other in-vehicle devices such as a navigation or wireless communication with the outside of the vehicle. As a result, when calculating the similarity SML in step S404 by the map similarity search unit 103, it is possible to perform processing in consideration of not only the information of the periphery sensor map but also these pieces of information.

Regarding this effect, first, an effect using a target will be described. In the present embodiment, it is assumed that the assistance pattern PTN [n] includes a positional relationship POS with the target closest to the host vehicle among the targets OBJ [m]. The positional relationship POS has three values of front, side, and rear as viewed from the host vehicle, and the map similarity search unit 103 compares the positional relationship POS in the assistance pattern PTN [n] with the positional relationship POS with the closest target among the detected targets OBJ [1], and calculates a target similarity SML_O of 0 when the positional relationships POS do not match, and 1 when the positional relationships POS match.

Then, a product obtained by multiplying the similarity SML to the periphery sensor map by the target similarity SML_O is used as the similarity SML. As a result, the assistance is executed in a case where the positional relationship with the target is similar.

Figure 11A:
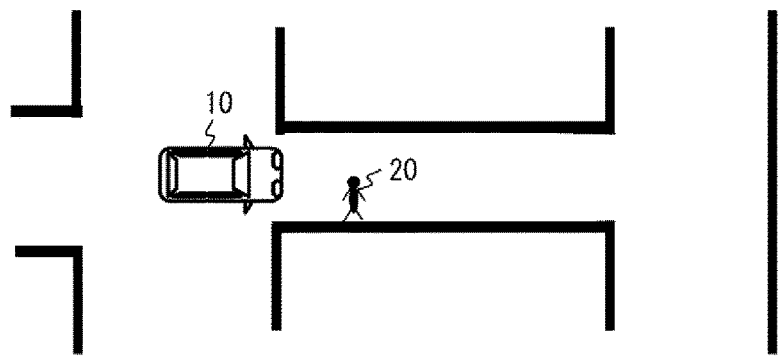
FIG. 11A is a diagram illustrating an example in which a pedestrian suddenly approaches a road and a driver suddenly brakes during traveling on a narrow path.
Figure 11B:
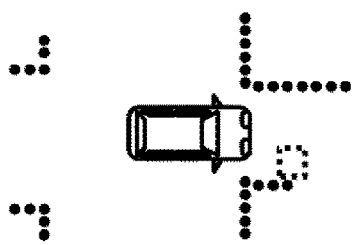
FIG. 11B is a diagram illustrating a positional relationship between a periphery sensor map and a target in the example of FIG. 11A.
Figure 11C:
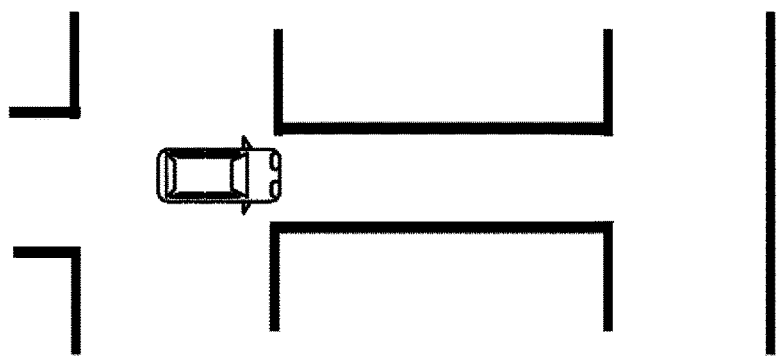
FIG. 11C is a diagram illustrating an example in which a terrain is similar but a target does not exist in front.

Effects thereof will be described with reference to FIGS. 11A, 11B, and 11C. FIG. 11A is a scene where a pedestrian exists in front of the vehicle when the vehicle is traveling on a narrow path, and is an example in which the pedestrian suddenly approaches the road and the driver suddenly brakes. At this time, as illustrated in FIG. 11B, the positional relationship POS with the target is also stored in the assistance pattern PTN [n] together with the periphery terrain information, so that the similarity is lowered in a case where the terrain is similar but the target does not exist in front as illustrated in FIG. 11C, and thus more appropriate assistance can be executed.

Furthermore, effects using the environment information will be described. In the present embodiment, it is assumed that the assistance pattern PTN [n] includes a time TM at which the assistance pattern is stored. The map similarity search unit 103 calculates a time e similarity SML_T that approaches 1.0 as the difference between the time TM in the assistance pattern PTN [n] and the current time TM is closer, and that approaches 0.0 as the difference between the time TM in the assistance pattern PTN [n] and the current time TM is different. Then, a product obtained by multiplying the similarity SML to the periphery sensor map by the time similarity SML_T is used as the similarity SML. As a result, the assistance is executed in a time zone close to the timing at which the assistance pattern is registered.

Furthermore, by using the date, it is possible to specify the sunrise and sunset time, and it is possible to implement functions such as assistance in a time zone of dawn or dusk in which the visibility of the driver is said to decrease, and assistance only at night, instead of simply determining whether the time is close.

When the assistance pattern is stored, by further registering the date to the date DT, the assistance pattern can be classified into, for example, four patterns of daytime, dawn, dusk, and nighttime together with the time TM, and a similarity SML_S of 1.0 is determined when it matches with the classification results of daytime, dawn, dusk, and nighttime of the current date DT and the time TM, and a similarity SML_S of 0.0 is determined when it does not match with the classification results of daytime, dawn, dusk, and nighttime of the current date DT and the time TM.

Then, a product obtained by multiplying the similarity SML to the periphery sensor map by the date similarity SML_S is used as the similarity SML. As a result, the assistance is executed in a time zone close to the timing at which the assistance pattern is registered.

In addition, by using the azimuth of the host vehicle, the direction of the host vehicle with respect to the position of the sun estimated from the date and time is taken into consideration, and for example, it is possible to implement assistance in a situation of back light. When the assistance pattern is stored, an azimuth DR in which the north is set to 0 is further registered, so that an azimuth similarity SML_D is calculated to be 1.0 as an absolute difference between the azimuth DR in the assistance pattern and the current azimuth DR is smaller, and an azimuth similarity SML_D is calculated to be 0.0 as the absolute difference is greater, together with the date DT and the time TM.

In addition, a distance between a height and an azimuth of the sun estimated from the date DT and the time TM in the assistance pattern and a height and an azimuth of the sun estimated from the current date DT and the time TM is calculated, and a sun position similarity SML_N is calculated to be 1.0 as the absolute difference is smaller and it is calculated to be 0.0 as the absolute difference is greater.

Then, a product obtained by multiplying the similarity SML to the periphery sensor map by the azimuth similarity SML_D and the sun position similarity SML_N described above is used as the similarity SML. As a result, the assistance is executed in the case of the position of the sun and the direction of the host vehicle close to the timing at which the assistance pattern is registered.

Furthermore, by acquiring the weather information, it is possible to implement assistance in consideration of the weather. Similarly, a weather WT is registered in the assistance pattern. It is assumed that the weather WT is, for example, four patterns of sunny, cloudy, rainy, and snowy. Then, a weather similarity SML_W is calculated to be 1.0 when the weather WT in the assistance pattern matches the current weather WT, and it is calculated to be 0.0 otherwise.

Then, a product obtained by multiplying the similarity SML to the periphery sensor map by the weather similarity SML_W is used as the similarity SML. As a result, the assistance is executed in the case of weather close to the timing at which the assistance pattern is registered.

The features of the present embodiment can also be summarized as follows.

The processor (FIG. 9, environment information acquisition unit 202) acquires environment information indicating an environment in the periphery of the vehicle (host vehicle 10) including at least a time. When registering/updating the assistance pattern PTN, the processor (the assistance pattern update unit 107) includes the environment information in the assistance pattern. When the second periphery sensor map (map MP) is similar to the first periphery sensor map (map MP) and the environment indicated by the environment information is detected, the processor (map similarity search unit 103, and assistance instruction unit 104) performs driving assistance of the assistance content (assistance function ASS) corresponding to the first periphery sensor map (map MP). As a result, when the vehicle travels in a place similar to a place requiring driving assistance, it is possible to determine whether to perform driving assistance according to the environment.

The environment information includes, for example, azimuth information indicating an azimuth of the vehicle (host vehicle 10) (FIG. 9). Thus, for example, it is possible to determine whether to perform driving assistance in accordance with the time and azimuth in which sunlight is dazzling (back light).

The processor (FIG. 9, target recognition unit 201) recognizes the target OBJ in the periphery of the vehicle (host vehicle 10) based on the sensor information. When registering/updating the assistance pattern, the processor (assistance pattern update unit 107) includes positional relationship information indicating a positional relationship between the vehicle and the target in the assistance pattern. When the second periphery sensor map (map MP) is similar to the first periphery sensor map (map MP) and the positional relationship indicated by the positional relationship information is detected, the processor (map similarity search unit 103, and assistance instruction unit 104) performs driving assistance of the assistance content (assistance function ASS) corresponding to the first periphery sensor map (map MP). As a result, when the vehicle travels in a place similar to a place requiring driving assistance, it is possible to determine whether to perform driving assistance according to the positional relationship between the vehicle and the target.

Third Embodiment

Next, a third embodiment of an in-vehicle driving assistance device of the present invention will be described below with reference to the drawings.

Figures 12, 13A, 13B:
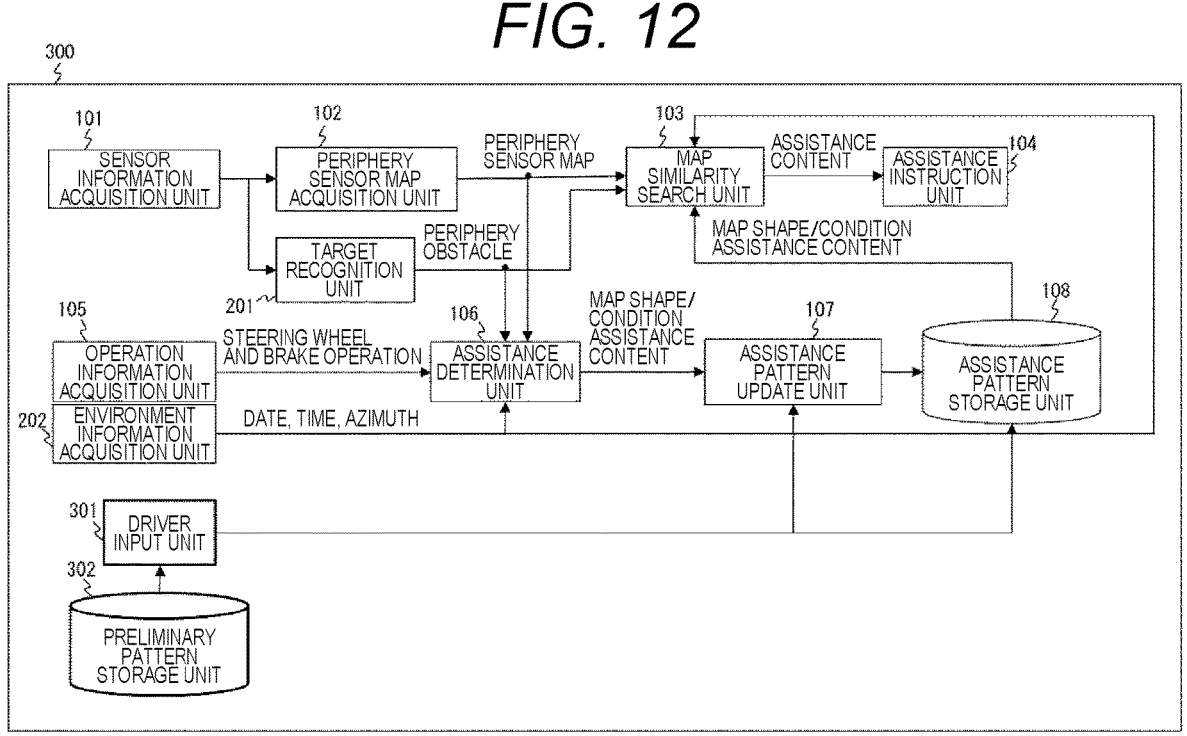
FIG. 12 is a functional block diagram of a driving assistance device according to a third embodiment.
FIG. 13A is a conceptual diagram illustrating an example of stored contents of a table in a preliminary pattern storage unit.
FIG. 13B is a conceptual diagram illustrating an example of stored contents of another table in the preliminary pattern storage unit.

FIG. 12 is a block diagram illustrating a configuration of a driving assistance device 300 according to a third embodiment. In the following description, only portions different from the driving assistance device 100 in the first embodiment and the driving assistance device 200 in the second embodiment described above will be described in detail, and the same portions will be denoted by the same reference numerals, and a detailed description thereof will be omitted.

The present embodiment is characterized in that selection of a driver obtained from a driver input unit 301 is considered.

FIGS. 13A and 13B illustrate processing of registering the selection result of the driver input unit 301 in the assistance pattern storage unit 108. A preliminary pattern storage unit 302 is prepared in the driving assistance device 300, and tables as illustrated in FIGS. 13A and 13B are stored.

In the table illustrated in FIG. 13B, information necessary for registration such as a map MP, a positional relationship POS with a target, a time TM, a date DT, and an azimuth DR is included as information of the assistance pattern, and in the table illustrated in FIG. 13A, a name of a bad scene obtained by verbalizing this, and assistance necessity are included. Note that, in the examples of FIGS. 13A and 13B, the records of both tables are linked by the value of the "No" field.

The name of the bad scene and the assistance necessity are displayed at the time of initial activation or from a setting screen (display) of the automobile, and the assistance necessity is switched by an input from the driver. As a result of this selection, the content of the preliminary pattern storage unit 302 is registered in the assistance pattern storage unit 108.

Figure 14:
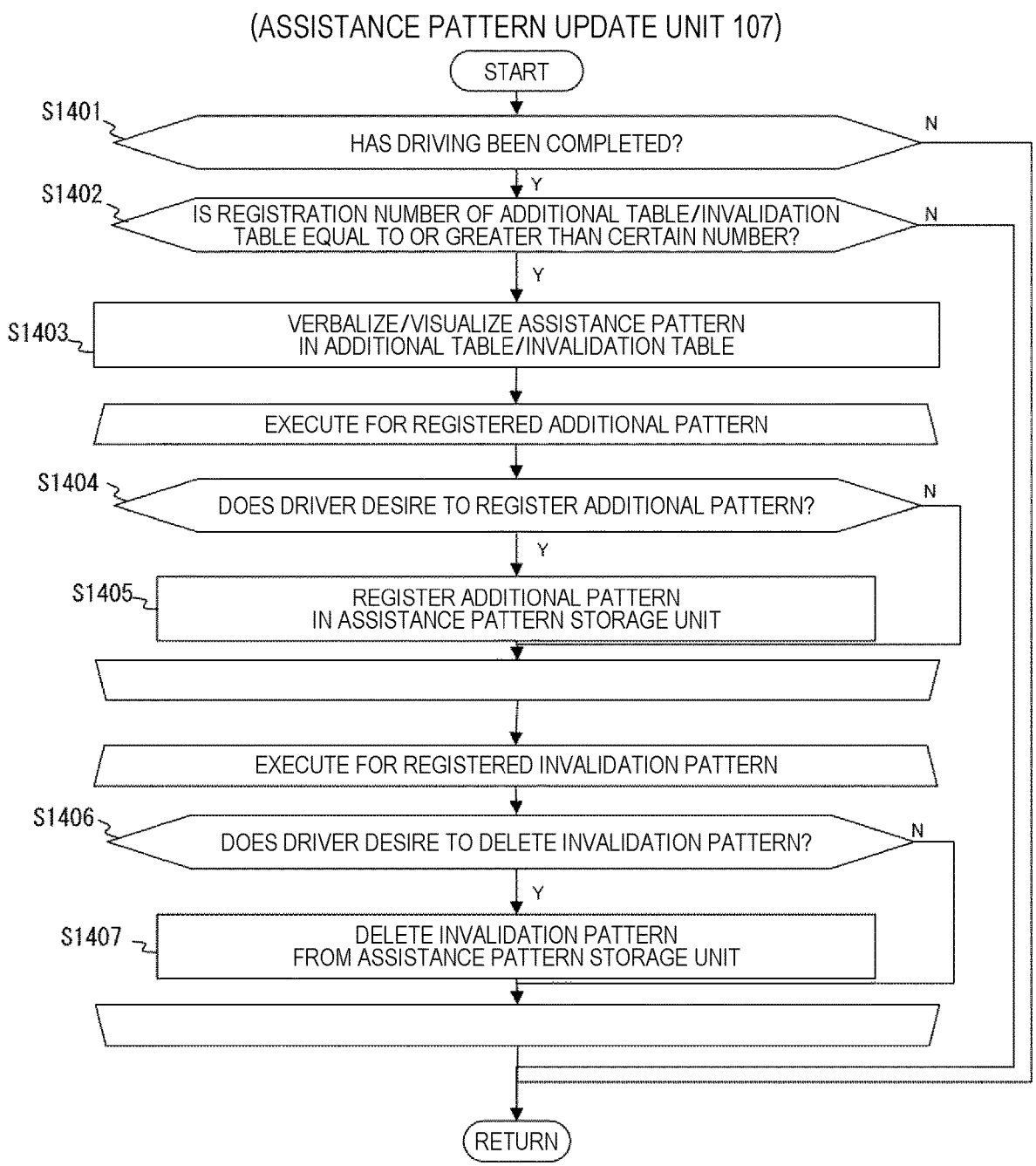
FIG. 14 is a flowchart for describing another operation procedure of the assistance pattern update unit.

The assistance pattern update unit 107 also cooperates with the driver input unit 301. FIG. 14 is a processing flow in a case where the input of the driver input unit 301 is used for the assistance pattern update unit 107.

First, in step S1401, it is determined whether the driving of the host vehicle has been completed. When the driving has been completed, the processing proceeds to step S1402. When the vehicle is in operation, the processing waits until the next processing cycle.

Next, in step S1402, it is determined whether the registration numbers of the additional table TBL_A and the invalidation table TBL_I are equal to or greater than a certain number, and when the registration numbers are equal to or greater than the certain number, step S1403 is performed. Otherwise, the processing waits until the next processing cycle.

In step S1403, the assistance pattern PTN registered in the additional table TBL_A and the invalidation table TBL_I is verbalized or visualized. For the verbalization, for example, a method based on machine learning in which a combination of a pattern and a language is learned in advance is used. In the present embodiment, it is assumed that the map MP in the assistance pattern PTN is displayed as visualization.

In step S1404, with respect to the assistance pattern PTN on the additional table TBL_A visualized in step S1403, the driver input unit 301 is used to instruct to input whether the driver desires the assistance.

In a case where the assistance is desired as a result of the input, the processing proceeds to step S1405, and the additional pattern is registered in the assistance pattern storage unit 108. When the assistance is not desired, the processing of step S1404 is performed for the assistance pattern PTN on the next additional table TBL_A. When the processing is completed for all the assistance patterns PTN in the additional table TBL_A, the processing proceeds to step S1406.

In step S1406, with respect to the assistance pattern PTN on the invalidation table TBL_I visualized in step S1403, the driver input unit 301 is used to instruct to input whether the driver desires invalidation of the assistance.

In a case where the invalidation of the assistance is desired as a result of the input, the processing proceeds to step S1407, and a valid flag V of the corresponding assistance pattern in the assistance pattern storage unit 108 is set to be invalid or registered in the invalidation pattern storage unit 109. In a case where the invalidation of the assistance is not desired, the processing in step S1406 is performed on the assistance pattern PIN on the next invalidation table TBL_I. When the processing is completed for all the assistance patterns PTN in the invalidation table TBL_I, the processing ends.

The features of the present embodiment can also be summarized as follows.

The driving assistance device 300 (FIG. 12) includes an input unit (driver input unit 301) that receives a driver's selection as an input. The memory (preliminary pattern storage unit 302) stores a preliminary assistance pattern including the first periphery sensor map (map MP) and the assistance content (assistance function ASS) of the driving assistance of the vehicle (host vehicle 10) corresponding to the first periphery sensor map (map MP). The processor (assistance pattern update unit 107) registers/updates the assistance pattern with the preliminary assistance pattern selected by the driver. As a result, the driver can register a necessary assistance pattern in advance.

In addition, the processor (assistance pattern update unit 107) presents a set of the second periphery sensor map (map MP) and the assistance content (assistance function ASS) corresponding to the operation information to the driver (FIG. 14, S1402), and registers/updates the assistance pattern with the set selected by the driver. As a result, the driver can select a place (bad scene) requiring driving assistance from the proposed set.

As described above, it is possible for the driver to select the assistance pattern detected at the time of initial activation or the assistance pattern detected automatically or the assistance pattern to be invalidated, and it is possible to execute more appropriate assistance for the driver.

Fourth Embodiment

Next, a fourth embodiment of an in-vehicle driving assistance device of the present invention will be described below with reference to the drawings.

FIG. 15 is a block diagram illustrating a configuration of a driving assistance device 400 according to a fourth embodiment. In the following description, only portions different from the driving assistance device 100 according to the first embodiment, the driving assistance device 200 according to the second embodiment, and the driving assistance device 300 according to the third embodiment described above will be described in detail, and the same portions will be denoted by the same reference numerals, and detailed description thereof will be omitted.

The present embodiment is characterized in that a sensor map storage unit 403, an in-map position estimation unit 401 that estimates a position on a sensor map in the sensor map storage unit, and a periphery sensor map acquisition unit 402 that extracts a periphery sensor map at the estimated position in the sensor map are provided.

The sensor map storage unit 403 is a region that stores a sensor map MP_G obtained by executing generation of the periphery sensor map MP at various places and joining them. In the joining, a global navigation satellite system (GNSS) for acquiring an absolute position of the host vehicle and a method such as dead reckoning for calculating a relative position of the host vehicle are combined and coupled. The pieces of sensor information acquired by the sensor information acquisition unit 101 may be joined by using a technique such as SLAM.

As a result, the sensor map MP_G is stored in association with the position information. In the present embodiment, as the sensor map MP_G, a map generated by joining periphery sensor maps MP generated when the host vehicle has traveled in the past is stored. In this case, since a map is generated in advance for a road usually used, driving assistance can be performed in a usually used situation. In addition, a sensor map of a main environment may be stored at an initial stage, or it may be acquired from an outside by communication. In this case, driving assistance is possible even at a place where the vehicle travels for the first time.

The in-map position estimation unit 401 acquires position information of the host vehicle and estimates a position LCL of the host vehicle in the sensor map MP_G. The position information of the host vehicle is obtained by combining a GNSS that acquires an absolute position of the host vehicle and a method such as dead reckoning that calculates a relative position of the host vehicle.

Although the GNSS can acquire the absolute position in the sensor map MP_G, the GNSS cannot acquire the absolute position with a sufficient accuracy when a processing cycle is slow and a radio wave condition is bad. Therefore, dead reckoning capable of processing in a relatively high cycle is used together, and during the GNSS reception cycle or when the radio wave condition is bad, the relative position calculation by dead reckoning is performed from the position of the last received GNSS, and the position on the sensor map MP_G is estimated. Alternatively, a provisional periphery sensor map MP_T can be generated by using the sensor information acquired from the sensor information acquisition unit 101, and estimation can be performed by map matching between the provisional periphery sensor map MP_T and the sensor map MP_G.

It is assumed that the periphery sensor map acquisition unit 402 extracts the sensor map MP_G in the periphery of a host vehicle position LCL from the position LCL of the host vehicle and the sensor map MP_G to obtain the periphery sensor map MP. In the periphery sensor map MP, the sensor map MP_G cut out from the vicinity of the host vehicle position LCL may be used as the surrounding sensor map MP as it is, but it is preferable to integrate the provisional periphery sensor map MP_T and the sensor map MP_G cut out from the vicinity of the host vehicle position LCL, use the periphery sensor map MP_T for the vicinity, and use information cut out from the sensor map MP_G for the outside of the sensing range of the periphery sensor map MP_T.

FIGS. 16A, 16B, and 16C are schematic diagrams for describing an effect of the periphery sensor map acquisition unit 402. As illustrated in FIG. 16A, when the two-wheeled vehicle 22 and the vehicle 21 exist in the periphery of the host vehicle, as illustrated in FIG. 16B, the sensing range of the provisional periphery sensor map MP_T generated by using the sensor information acquired from the sensor information acquisition unit 101 is limited by the target, and the terrain information at the back of the two-wheeled vehicle 22 and the vehicle 21 cannot be obtained. Note that a dotted circle or an ellipse in FIG. 16B indicates a blind spot by a target.

However, by performing the processing of the periphery sensor map acquisition unit 402 indicated in the present embodiment, the periphery terrain information can be acquired as illustrated in FIG. 16C even when the sensing range is limited by the two-wheeled vehicle 22 or the vehicle 21.

As described above, by using the sensor map storage unit 403, it is possible to use a map of a wider range than the provisional periphery sensor map MP_T generated by using the sensor information acquired from the sensor information acquisition unit 101.

In addition, a traveling route PTH of the host vehicle can be provided on the sensor map storage unit 403 as long as it is a travel path traveled in the past, and more appropriate driving assistance can be performed by using the traveling route PTH. FIGS. 17A to 17D are schematic diagrams for describing the contents. The traveling route PTH may be acquired from, for example, a navigation or the like, and used by being superimposed on the periphery sensor map MP_G.

Figure 17A:
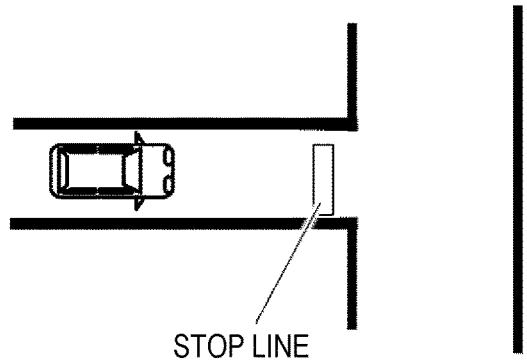
FIG. 17A is a diagram illustrating an intersection with poor visibility.
Figure 17B:
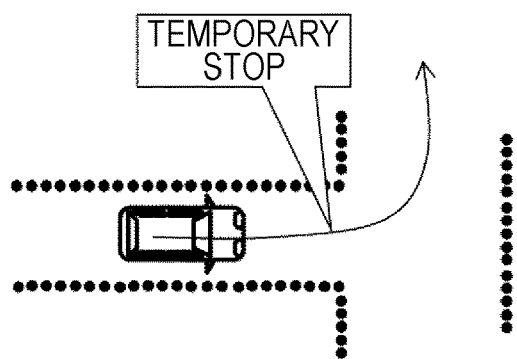
FIG. 17B is a diagram illustrating a periphery sensor map in an example in which a driver suddenly brakes when the host vehicle is about to turn left at the intersection of FIG. 17A.

FIG. 17A is a scene of passing through an intersection with poor visibility. In a case where the driver suddenly brakes when the host vehicle is about to turn left from such an intersection, the periphery sensor map MP and the like are stored in the assistance pattern storage unit 108 as illustrated in FIG. 17B.

Then, when the host vehicle travels in a similar environment, by having the traveling route PTH of the host vehicle on the sensor map MP_G, in a scene of passing through an intersection with poor visibility, not only an alarm as indicated in the first and second embodiments but also assistance such temporarily as stopping before the intersection and suppressing acceleration at the time of starting in the vicinity thereof can be performed.

Figure 17C:
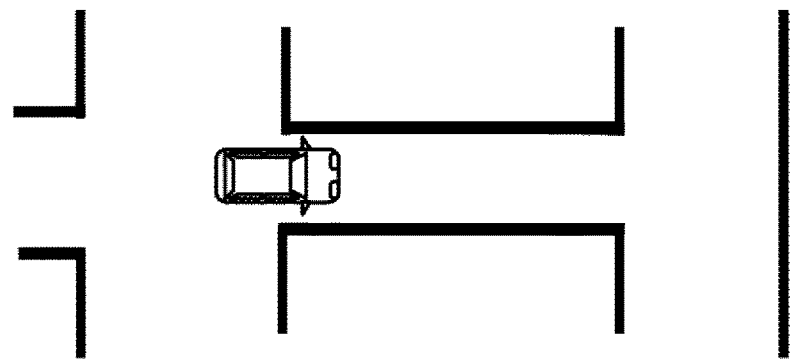
FIG. 17C is a diagram illustrating an example of traveling at a speed sufficiently lower than a speed limit when traveling straight on a narrow path.
Figure 17D:
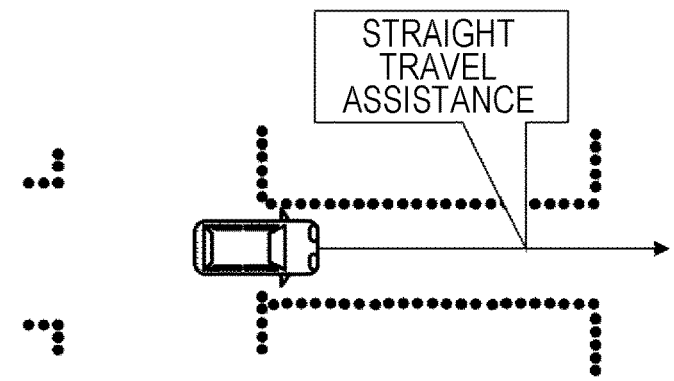
FIG. 17D is a diagram illustrating a periphery sensor map in the example of FIG. 17C.

FIG. 17C is a scene of passing through a narrow path. When the driver travels straight on such a narrow path at a speed sufficiently lower than the speed limit, the periphery sensor map MP and the like are stored in the assistance pattern storage unit 108 as illustrated in FIG. 17D.

Then, when the host vehicle travels in a similar environment, by having the traveling route PTH of the host vehicle on the sensor map MP_G, it is possible to perform assistance (vehicle control) such as generating a reaction force of the steering in a case where the host vehicle deviates from the traveling route in which the host vehicle travels straight and suppressing acceleration at the time of starting in the vicinity thereof, in addition to the alarm as indicated in the first and second embodiments, in such a narrow path.

Figure 18A:
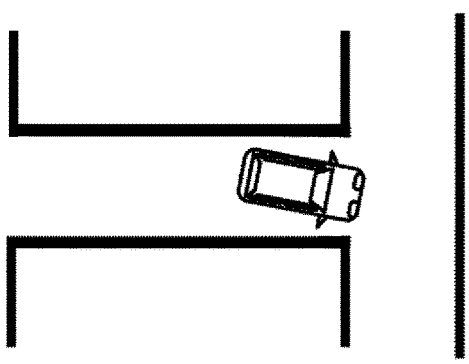
FIG. 18A is a diagram illustrating an example in which a vehicle passes near a wall when turning on a narrow path, or an example in which it is determined that turning cannot be performed as it is in the middle of turning and switching to a back gear is performed.
Figure 18B:
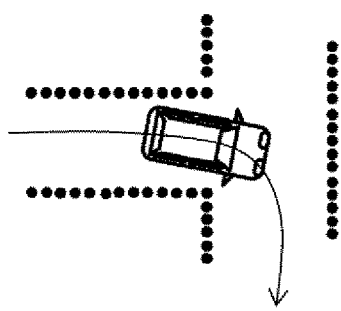
FIG. 18B is a diagram illustrating a periphery sensor map in the example of FIG. 18A.

FIG. 18A is a scene of turning on a narrow path. In a case where the driver passes near the wall when turning on such a narrow path, or in a case where it is determined that turning cannot be performed as it is in the middle of turning and the gear is switched to the back gear, the periphery sensor map MP and the like are stored in the assistance pattern storage unit 108 as illustrated in FIG. 18B. Then, when the host vehicle travels in a similar environment, by having the traveling route PTH of the host vehicle on the sensor map MP_G, it is possible to perform assistance such as moving the steering from the position where the turning is to be started and suppressing acceleration at the time of starting in the vicinity thereof in addition to the alarm as indicated in the first and second embodiments, in the turning on such a narrow path.

Figure 18C:
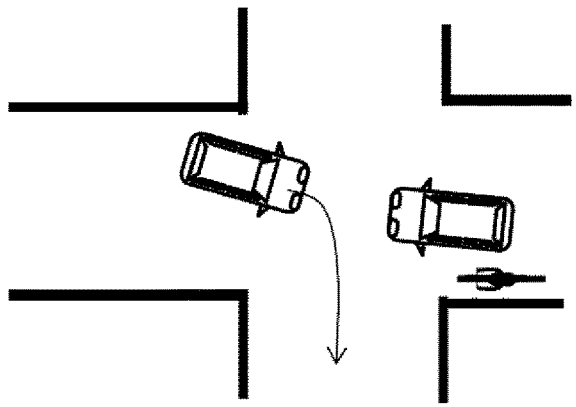
FIG. 18C is a diagram illustrating an example in which, when turning right at an intersection, a two-wheeled vehicle or the like jumps out from behind an oncoming vehicle and a driver suddenly brakes in a case where visibility of an oncoming lane is poor due to existence of the oncoming vehicle.
Figure 18D:
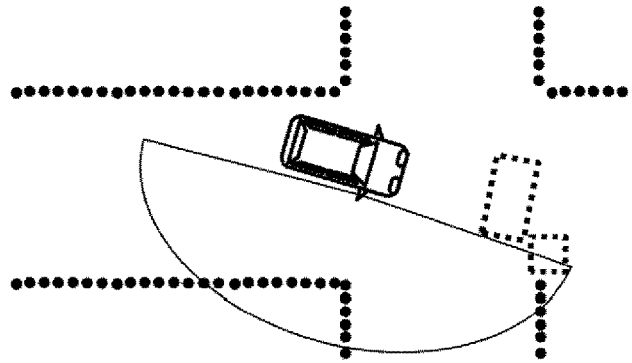
FIG. 18D is a diagram illustrating a positional relationship between a periphery sensor map and a target in the example of FIG. 18C.

FIG. 18C is a scene of turning right at the intersection. In a case where an oncoming vehicle exists and visibility of an oncoming lane is poor, and a two-wheeled vehicle or the like jumps out from behind the oncoming vehicle and the driver suddenly brakes, the periphery sensor map MP, the positional relationship POS with the target, and the like are stored in the assistance pattern storage unit 108 as illustrated in FIG. 18D.

Then, by having the traveling route PTH of the host vehicle on the sensor map MP_G when the host vehicle travels in a similar environment, it is possible to execute an alarm, acceleration suppression, braking, and the like according to an approach state by making full use of the sensor information in which the vehicle or the two-wheeled vehicle in the oncoming lane can be viewed at a timing earlier than the driver's viewpoint in the right turn at the intersection.

The features of the present embodiment can also be summarized as follows.

The memory (FIG. 15, sensor map storage unit 403) stores a sensor map MP_G obtained by joining a plurality of second periphery sensor maps (maps MP). The processor (in-map position estimation unit 401) estimates a position LCL of the vehicle (host vehicle 10) on the sensor map MP_G based on the sensor information. The processor (the periphery sensor map acquisition unit 402) acquires a second periphery sensor map (map MP) from the sensor map MP_G at the estimated vehicle position LCL. As a result, for example, the second periphery sensor map (map MP) of the place where the vehicle has traveled in the past can be utilized. In addition, the traveling route PTH of the host vehicle can be acquired from the position LCL of the vehicle (host vehicle 10) on the sensor map MP_G.

The operation state indicated by the operation information (operation criterion TRG) is, for example, a state in which the backward operation is performed while the vehicle (host vehicle 10) is turning (FIG. 18A). The assistance content (assistance function ASS) corresponding to the operation information (operation criterion TRG) is, for example, turning control of the vehicle. As a result, with the detection of the state in which the backward operation is performed while the vehicle is turning as a trigger, the assistance content is associated with the first periphery sensor map. Then, when the vehicle travels in a place similar to the place where the backward operation has been performed during the turning, the turning control of the vehicle can be performed as driving assistance.

As described above, since the sensor map storage unit 403 is provided and the traveling route PTH of the host vehicle can be referred to by using the sensor map MP_G, assistance such as stop assistance and steering assistance using the traveling route PTH can be performed.

Fifth Embodiment

Next, a fifth embodiment of an in-vehicle driving assistance device of the present invention will be described below with reference to the drawings.

Figure 19:
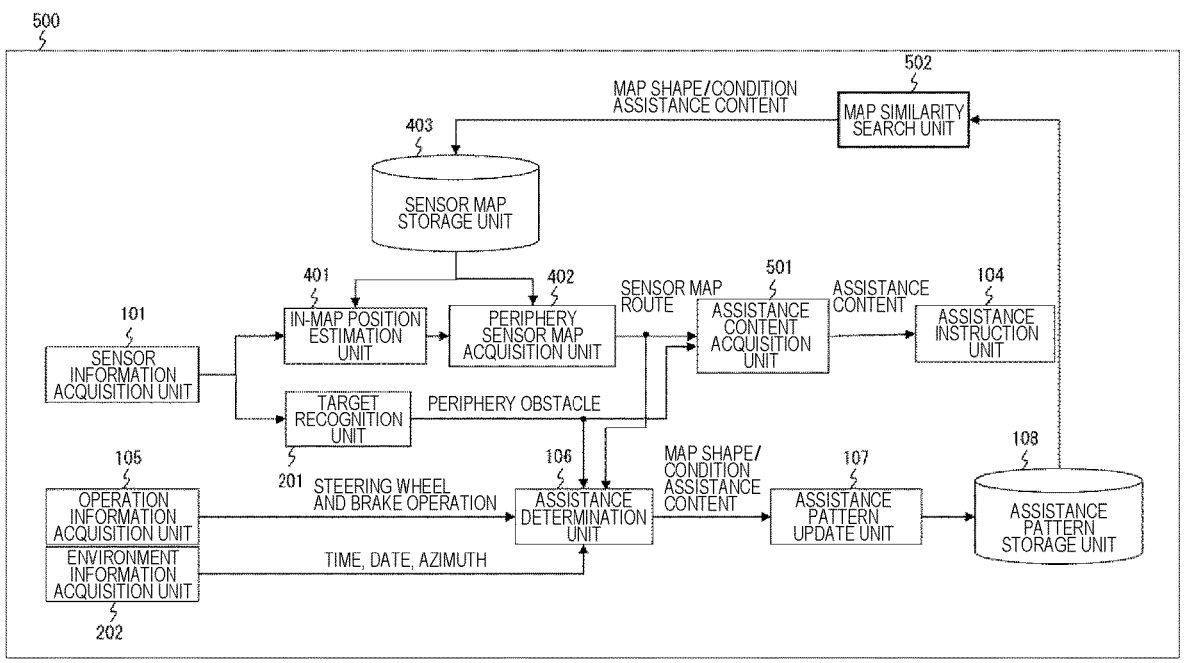
FIG. 19 is a functional block diagram of a driving assistance device according to a fifth embodiment.

FIG. 19 is a block diagram illustrating a configuration of a driving assistance device 500 according to a fifth embodiment. In the following description, only portions different from the driving assistance device 100 in the first embodiment, the driving assistance device 200 in the second embodiment, the driving assistance device 300 in the third embodiment, and the driving assistance device 400 in the fourth embodiment described above will be described in detail, and the same portions will be denoted by the same reference numerals, and detailed description thereof will be omitted.

The present embodiment is characterized in that the similarity to the pattern in the assistance pattern storage unit 108 is calculated and registered in advance in the sensor map MP_G in the sensor map storage unit 403, and the assistance content acquisition unit 501 directly refers to the assistance content from the sensor map MP_G based on the host vehicle position LCL and notifies the assistance instruction unit 104 of the assistance content.

As a result, by registering a place corresponding to the assistance pattern PTN in the sensor map MP_G in the sensor map storage unit 403 in advance, the processing of the map similarity search unit while the host vehicle is traveling can be omitted, and the processing load can be reduced.

In the assistance as described above, the alarm is not limited to a simple sound alarm, and includes an alarm by illumination using an LED, a display on a monitor in the vehicle, and a method of displaying a camera image on the monitor in a case where a sensor mounted on the vehicle is a camera.

Note that the present invention is not limited to the above-described embodiments, and includes various modifications. For example, the above-described embodiments have been described in detail for easy understanding of the present invention, and are not necessarily limited to those having all the described configurations. Further, a part of a configuration of one embodiment can be replaced with a configuration of another embodiment, and the configuration of another embodiment can be added to the configuration of one embodiment. In addition, it is possible to add, delete, and replace other configurations for a part of the configuration of each embodiment.

In addition, some or all of the above-described configurations, functions, and the like may be implemented by hardware, for example, by designing with an integrated circuit. In addition, each of the above-described configurations, functions, and the like may be implemented by software by a processor interpreting and executing a program for implementing each function. Information such as a program, a table, and a file for implementing each function can be stored in a recording device such as a memory, a hard disk, and a solid state drive (SSD), or a recording medium such as an IC card, an SD card, and a DVD.

Embodiments of the present invention may have the following aspects.

(1). A driving assistance device including: a sensor information acquisition unit that acquires information from an external recognition sensor mounted in a periphery of a host vehicle; a periphery sensor map acquisition unit that acquires a sensor map in the periphery of the host vehicle based on the sensor information; an assistance pattern storage unit that stores an assistance pattern including a sensor map shape on which driving assistance control is to be executed and an assistance content corresponding to the sensor map shape; map similarity search unit that calculates a similarity between the acquired sensor map and the registered assistance pattern; and an assistance instruction unit that instructs to execute driving assistance of an assistance content corresponding to the sensor map shape having a high similarity to the sensor map when the map similarity search unit determines that the sensor map has a high similarity to the sensor map shape on which driving assistance control is to be executed and it is a place where the driving assistance control is to be executed.

(2). The driving assistance device according to (1), further including: a driving operation information acquisition unit that acquires driving operation information of a driver; an assistance determination unit that determines driving assistance necessity based the driving operation information and the sensor map; and an assistance pattern update unit that registers/updates, when the assistance determination unit determines that assistance is required, assuming that the corresponding sensor map shape is a situation where driving assistance is to be performed, with a set of the sensor map shape and the assistance content in the assistance pattern storage unit.

(3). The driving assistance device according to (2), in which the periphery sensor map acquisition unit generates a sensor map in the periphery of the host vehicle based on sensor information acquired by the external recognition sensor.

(4). The driving assistance device according to (2), further including: a sensor map storage unit that stores the sensor map; and an in-map position estimation unit that estimates a host vehicle position in the sensor map based on the sensor information, in which the periphery sensor map acquisition unit acquires the sensor map in the periphery of the host vehicle from a map stored in the sensor map storage unit based on a host vehicle estimated position in the map.

(5). The driving assistance device according to (2), further including: an environment information acquisition unit that acquires environment information including at least a time, in which the environment information is added to the assistance pattern and registered in the assistance pattern storage unit.

(6). The driving assistance device according to (2), further including: an azimuth information acquisition unit that acquires azimuth information of the host vehicle, in which the azimuth information is added to the assistance pattern and registered in the assistance pattern storage unit.

(7). The driving assistance device according to (2), further including: a target recognition unit that recognizes a mutual positional relationship between targets configured by dynamic object information in the periphery of the host vehicle and a positional relationship between the target and the host vehicle based on the sensor information, in which positional relationship information of the target is added to the assistance pattern and registered in the assistance pattern storage unit.

(8). The driving assistance device according to (3), in which when the assistance determination unit detects a sudden braking operation based on an input of the operation information acquisition unit, the assistance pattern update unit registers and updates an alarm as driving assistance in a form corresponding to the corresponding sensor map shape.

(9). The driving assistance device according to (3), in which when the assistance determination unit acquires speed limit information at a host vehicle traveling position and detects that a traveling speed of the host vehicle acquired by the operation information acquisition unit is slower than the speed limit, the assistance pattern update unit registers and updates an alarm as driving assistance in a form corresponding to the corresponding sensor map shape.

(10). The driving assistance device according to (3), in which when the assistance determination unit detects that an operation frequency of a driving assistance function included in the host vehicle is high based on the information acquired from the operation information acquisition unit, the assistance pattern update unit registers and updates adjusting a parameter of the driving assistance function included in the host vehicle as driving assistance in a form corresponding to the corresponding sensor map shape.

(11). The driving assistance device according to (4), in which when the assistance determination unit detects a sudden braking operation based on an input of the operation information acquisition unit, the assistance pattern update unit registers and updates control of an alarm, deceleration assistance, or acceleration suppression as driving assistance in a form corresponding to the corresponding sensor map shape.

(12). The driving assistance device according to (4), in which in the assistance pattern update unit, the assistance determination unit acquires speed limit information at a host vehicle traveling position, detects that the speed acquired by the operation information acquisition unit is slower than the speed limit, and registers and updates control of an alarm, deceleration assistance, or acceleration suppression as driving assistance in a form corresponding to the corresponding sensor map shape.

(13). The driving assistance device according to (4), in which in the assistance pattern, the assistance determination unit detects a backward operation during turning by the operation information acquisition unit, and registers and updates turning assistance control as driving assistance in a form corresponding to the corresponding sensor map shape.

(14). The driving assistance device according to (2), in which the assistance pattern update unit classifies sensor map shapes in the assistance pattern based on a pattern similarity, and sets, as a search target of the map similarity search unit, only an assistance pattern in which a certain number or more of similar sensor map shapes are collected as a result of the classification.

(15). The driving assistance device according to (14), in which the assistance pattern update unit observes validity of driving assistance instructed by the assistance instruction unit, and does not set an assistance pattern having more than a certain percentage of invalid assistance patterns among assistance patterns in which a certain number or more of sensor map shapes similar to each other as a result of the classification are collected as a search target for the map similarity search unit.

(16). The driving assistance device according to (2), further including an input unit for input by the driver, in which the assistance pattern storage unit registers a sensor map shape and an assistance content stored in advance in the assistance pattern storage unit based on the input from the driver.

(17). The driving assistance device according to (2), further including an input unit for input by the driver, in which the sensor map shape and the assistance content determined by a system to be in need of assistance are presented to the driver, and when the driver inputs a desire for assistance to the input unit, the corresponding sensor map shape is set as a search target of the map similarity search unit.

According to (1) to (17), by automatically detecting a situation in which the driver needs driving assistance and storing the situation in information on the periphery terrain and obstacles, it is possible to execute appropriate driving assistance in a similar situation.

REFERENCE SIGNS LIST 100 driving assistance device
101 sensor information acquisition unit
102 periphery sensor map acquisition unit
103 map similarity search unit
104 assistance instruction unit
105 operation information acquisition unit
106 assistance determination unit
107 assistance pattern update unit
108 assistance pattern storage unit
109 invalidation pattern storage unit
200 driving assistance device
201 target recognition unit
202 environment information acquisition unit
300 driving assistance device
301 driver input unit
302 preliminary pattern storage unit
400 driving assistance device
401 in-map position estimation unit
402 periphery sensor map acquisition unit
403 sensor map storage unit
406 sensor map storage unit
500 driving assistance device
501 assistance content acquisition unit

The invention claimed is:

1. A driving assistance device comprising:
a memory that stores an assistance pattern including a first periphery sensor map indicating a map in a periphery of a vehicle and an assistance content of driving assistance of the vehicle corresponding to the first periphery sensor map; and
a processor that
acquires sensor information indicating information on an object in the periphery of the vehicle sensed by a sensor,
acquires a second periphery sensor map based on the sensor information, and
performs driving assistance of the assistance content corresponding to the first periphery sensor map when the second periphery sensor map is similar to the first periphery sensor map, wherein
the memory stores a list including operation information indicating an operation state requiring driving assistance and the assistance content corresponding to the operation information,
the processor registers/updates the assistance pattern with a set of the second periphery sensor map and the assistance content corresponding to the operation information when the operation state indicated by the operation information is detected,
the processor clusters the first periphery sensor map,
the processor performs driving assistance of the assistance content corresponding to the first periphery sensor map in a cluster when the first periphery sensor map in the cluster is equal to or greater than a certain number,
the list includes a determination criterion for determining validity/invalidity of the driving assistance corresponding to the assistance content, and
the processor
determines validity/invalidity of the driving assistance based on a determination criterion corresponding to the assistance content for which the driving assistance has been performed,
performs driving assistance of the assistance content corresponding to the first periphery sensor map, when a number of the first periphery sensor maps corresponding to the assistance content determined to be invalid in the cluster is less than a certain number, and
does not perform driving assistance of the assistance content corresponding to the first periphery sensor map, when the number of the first periphery sensor maps corresponding to the assistance content determined to be invalid in the cluster is equal to or greater than a certain number.

2. The driving assistance device according to claim 1, wherein the processor generates the second periphery sensor map based on the sensor information.

3. The driving assistance device according to claim 2, wherein
an operation state indicated by the operation information is a state in which a sudden braking operation is performed, and
the assistance content corresponding to the operation information is an alarm or control of deceleration or acceleration suppression.

4. The driving assistance device according to claim 2, wherein an operation state indicated by the operation information is a state in which a traveling speed of the vehicle is slower than a speed limit at a traveling position of the vehicle, and
the assistance content corresponding to the operation information is an alarm or control of deceleration or acceleration suppression.

5. The driving assistance device according to claim 2, wherein
an operation state indicated by the operation information is a state in which a frequency of the driving assistance is higher than a predetermined value, and
the assistance content corresponding to the operation information is a change of a parameter for adjusting a function of the driving assistance.

6. The driving assistance device according to claim 1, wherein
the memory stores a sensor map obtained by joining a plurality of the second periphery sensor maps, and
the processor
estimates a position of the vehicle on the sensor map based on the sensor information, and
acquires the second periphery sensor map from the sensor map at the estimated position of the vehicle.

7. The driving assistance device according to claim 6, wherein
an operation state indicated by the operation information is a state in which a backward operation is performed while the vehicle is turning, and
the assistance content corresponding to the operation information is turning control of the vehicle.

8. The driving assistance device according to claim 1, wherein
the processor
acquires environment information indicating an environment in the periphery of the vehicle including at least a time,
includes the environment information in the assistance pattern when the assistance pattern is registered/updated, and
performs driving assistance of the assistance content corresponding to the first periphery sensor map when the second periphery sensor map is similar to the first periphery sensor map and the environment indicated by the environment information is detected.

9. The driving assistance device according to claim 8, wherein the environment information includes azimuth information indicating an azimuth of the vehicle.

10. The driving assistance device according to claim 1, wherein
the processor
recognizes a target in the periphery of the vehicle based on the sensor information,
includes positional relationship information indicating a positional relationship between the vehicle and the target in the assistance pattern when the assistance pattern is registered/updated, and
performs driving assistance of the assistance content corresponding to the first periphery sensor map when the second periphery sensor map is similar to the first periphery sensor map and the positional relationship indicated by the positional relationship information is detected.

11. The driving assistance device according to claim 1, further comprising an input unit that receives a selection of a driver as an input, wherein the memory stores a preliminary assistance pattern including the first periphery sensor map and an assistance content of driving assistance of the vehicle corresponding to the first periphery sensor map, and the processor registers/updates the assistance pattern with the preliminary assistance pattern selected by the driver.

12. The driving assistance device according to claim 1, further comprising an input unit that receives a selection of a driver as an input, wherein the processor presents the set of the second periphery sensor map and the assistance content corresponding to the operation information to the driver, and registers/updates the assistance pattern with the set selected by the driver.

* * * * *